June 29, 1971     R. J. MAGUIRE     3,588,988
METHOD AND MACHINE FOR ASSEMBLING A DISPENSER
Filed Oct. 24, 1968     15 Sheets-Sheet 1
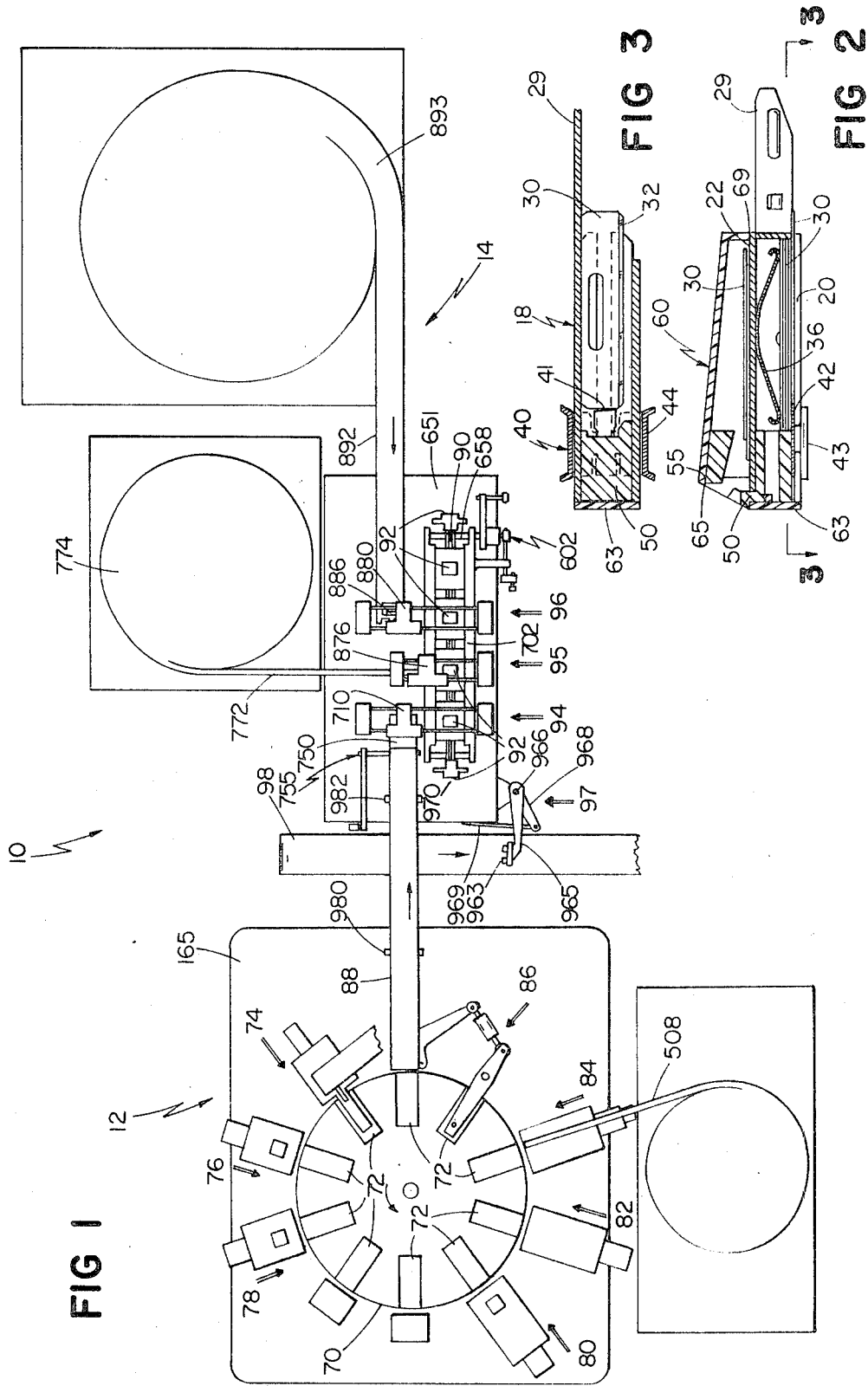

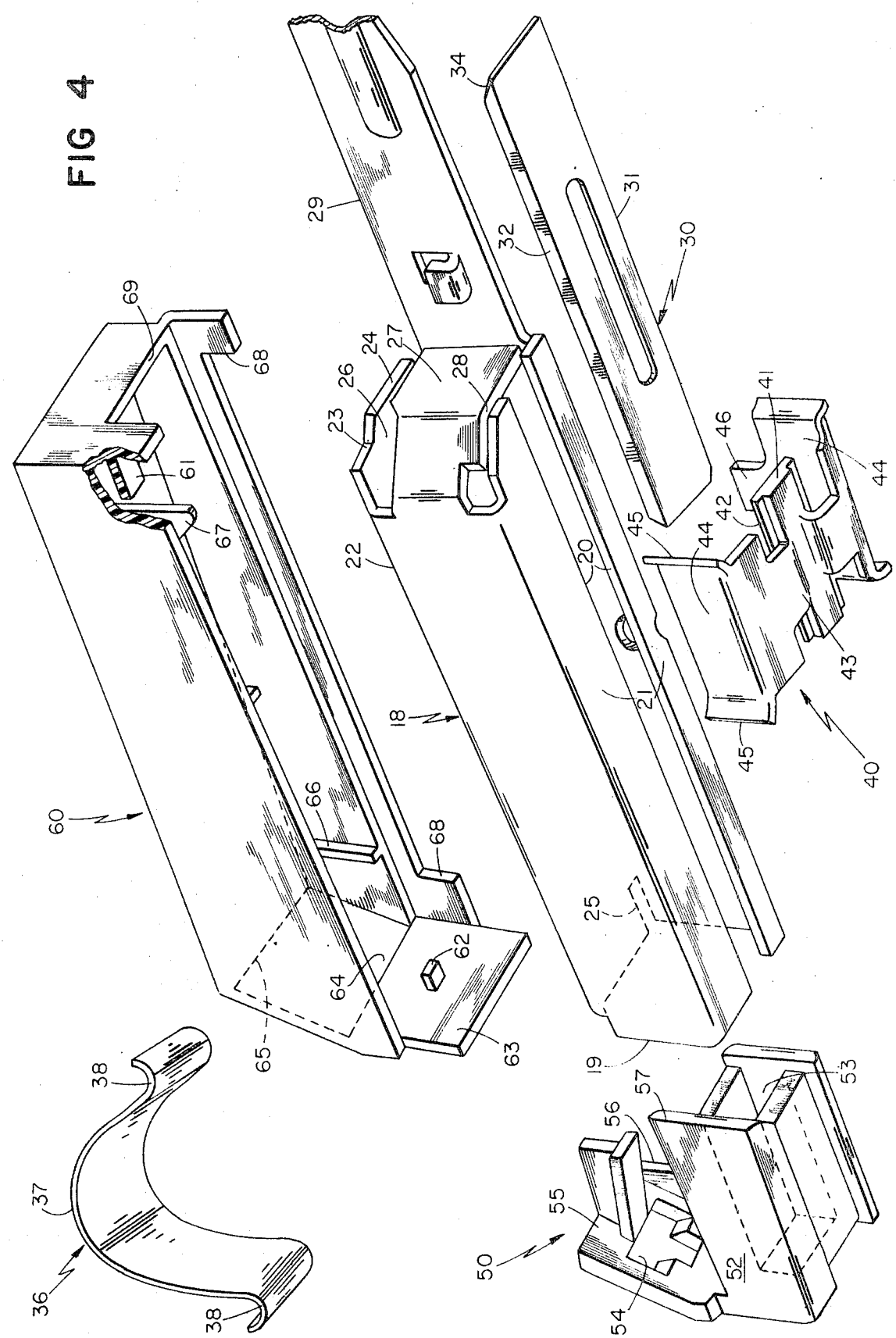

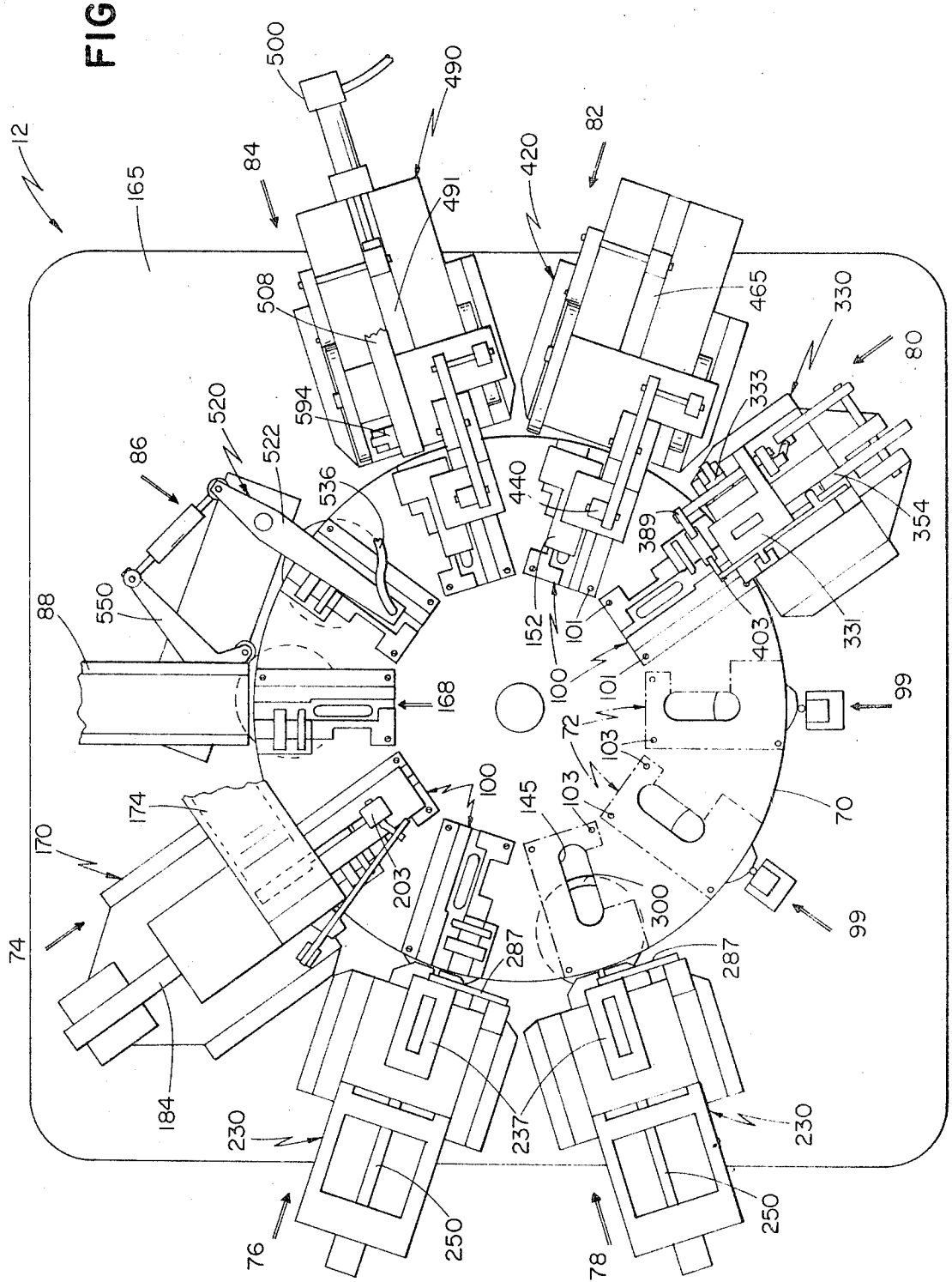

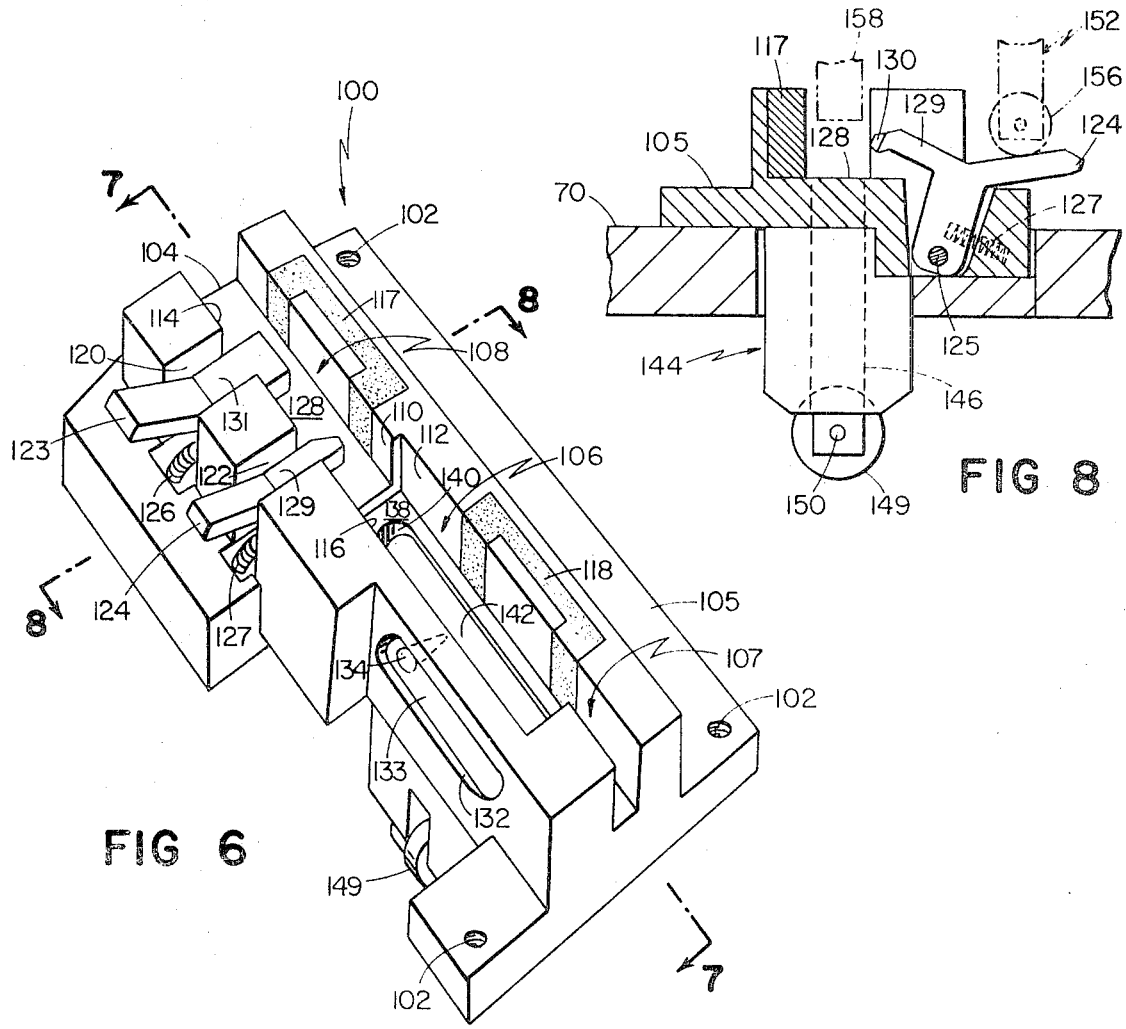
FIG 8
FIG 6
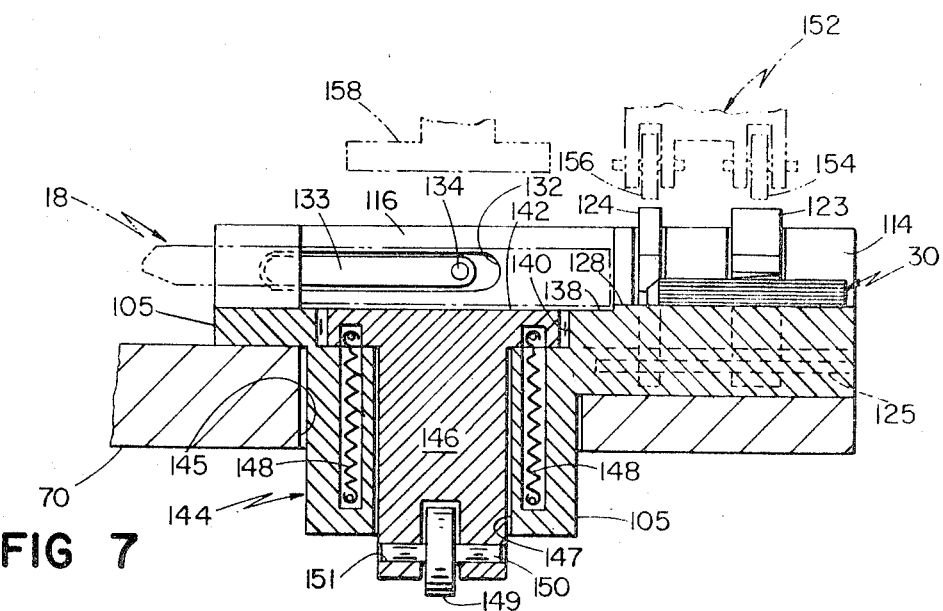
FIG 7

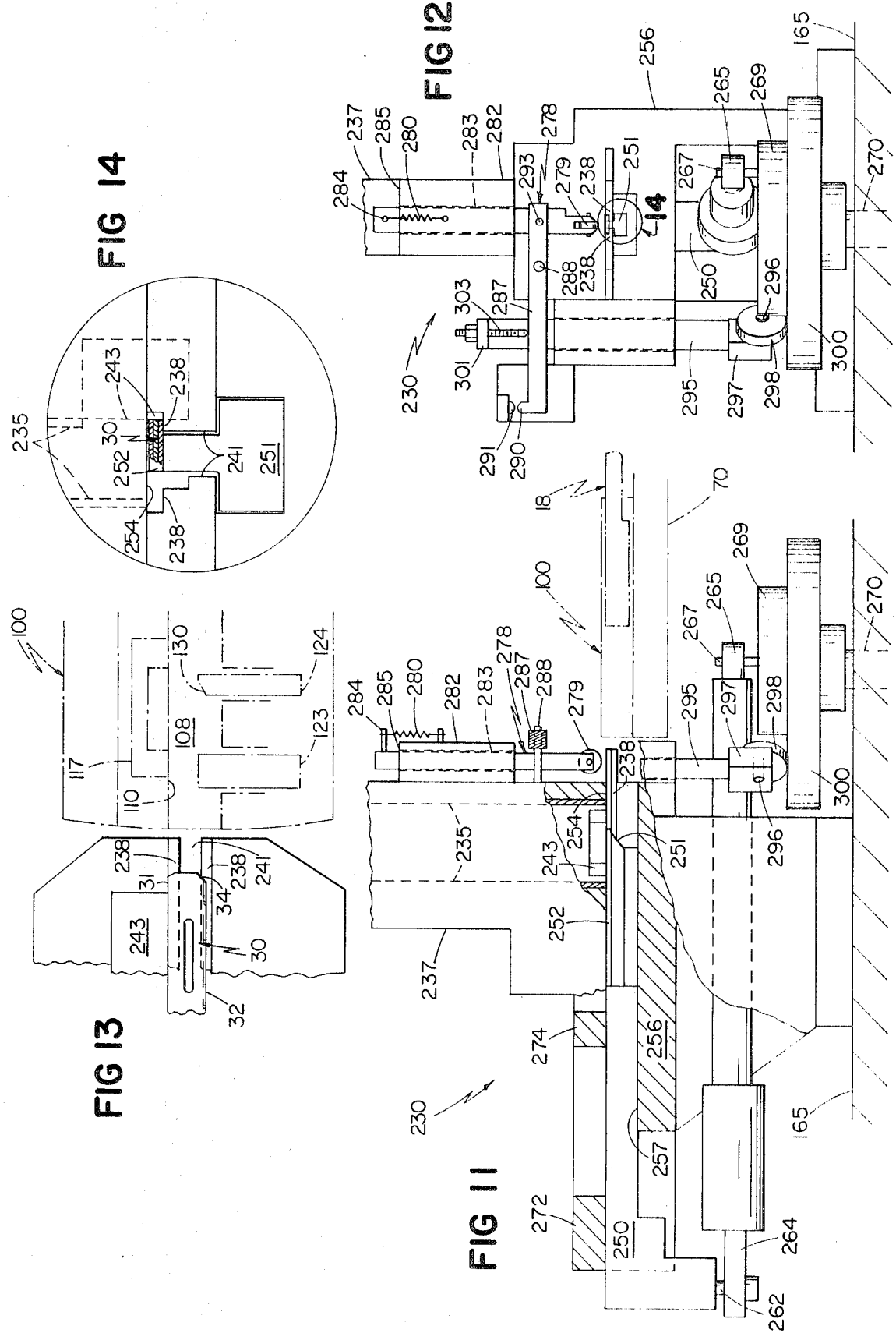

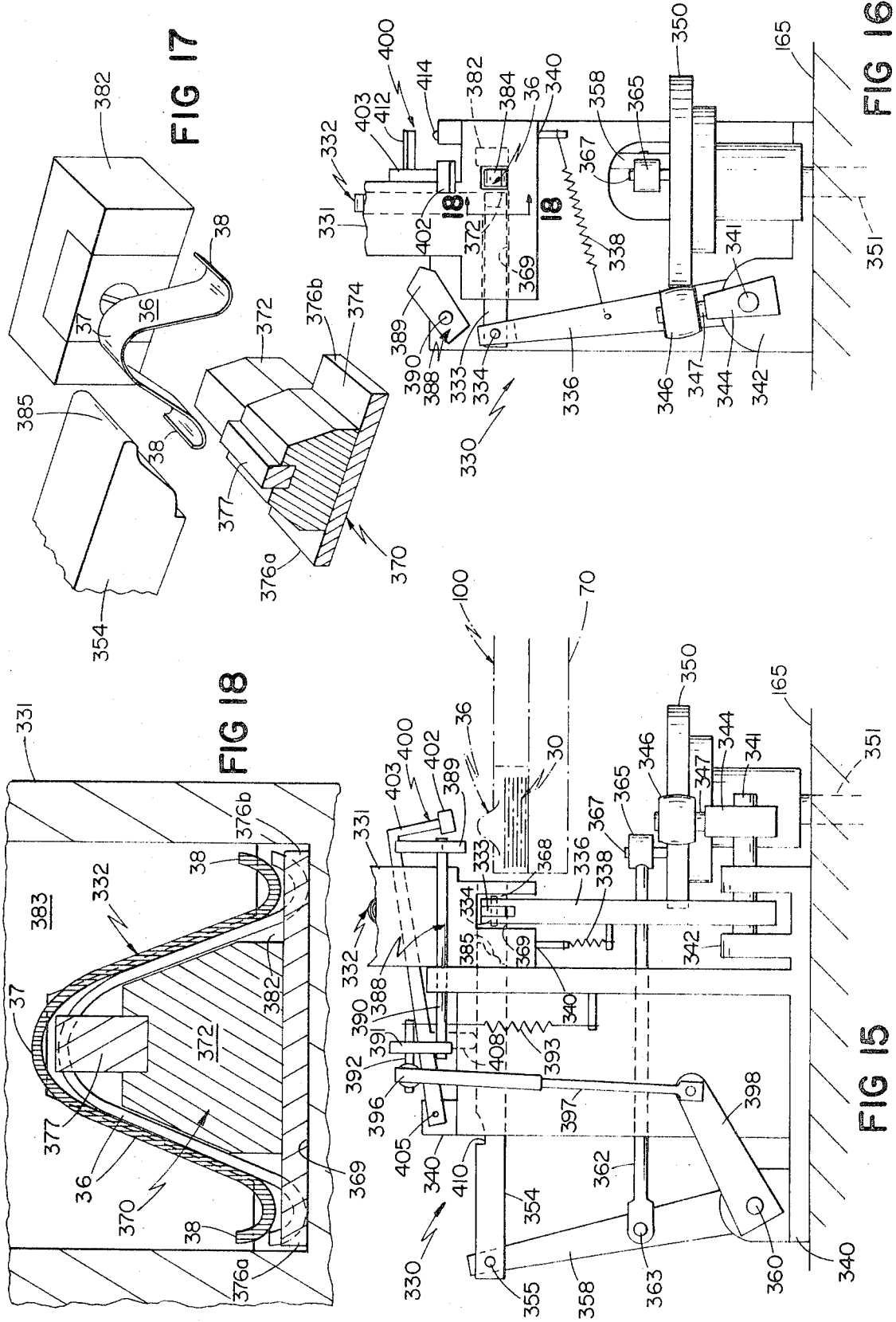

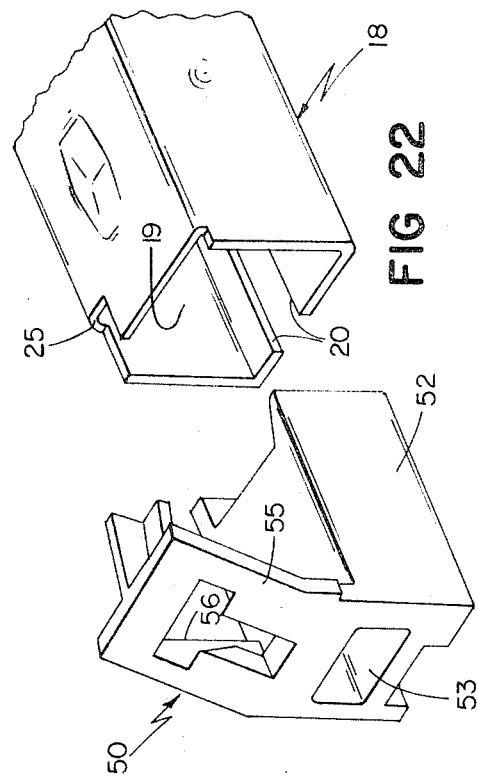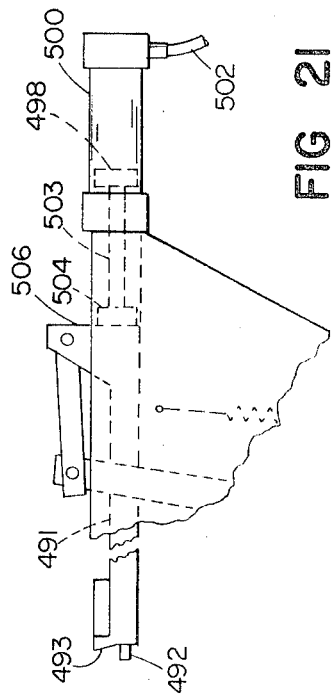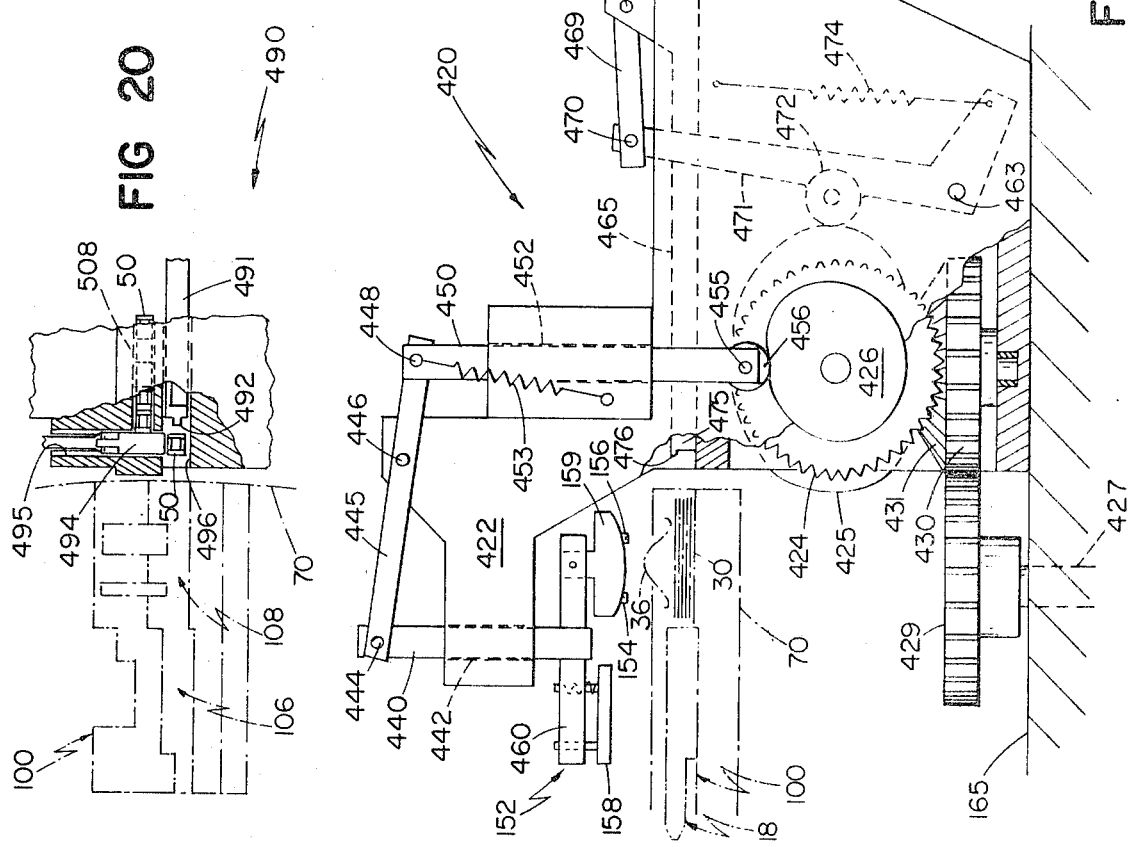

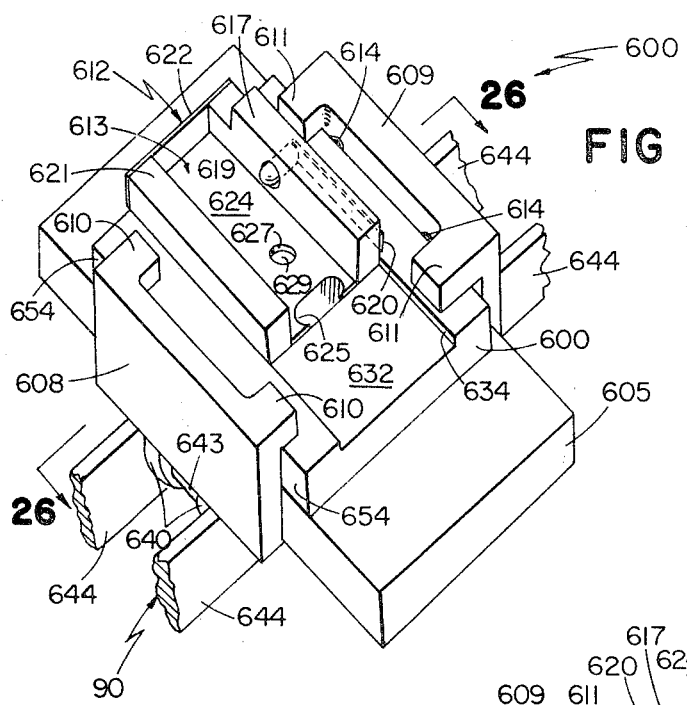

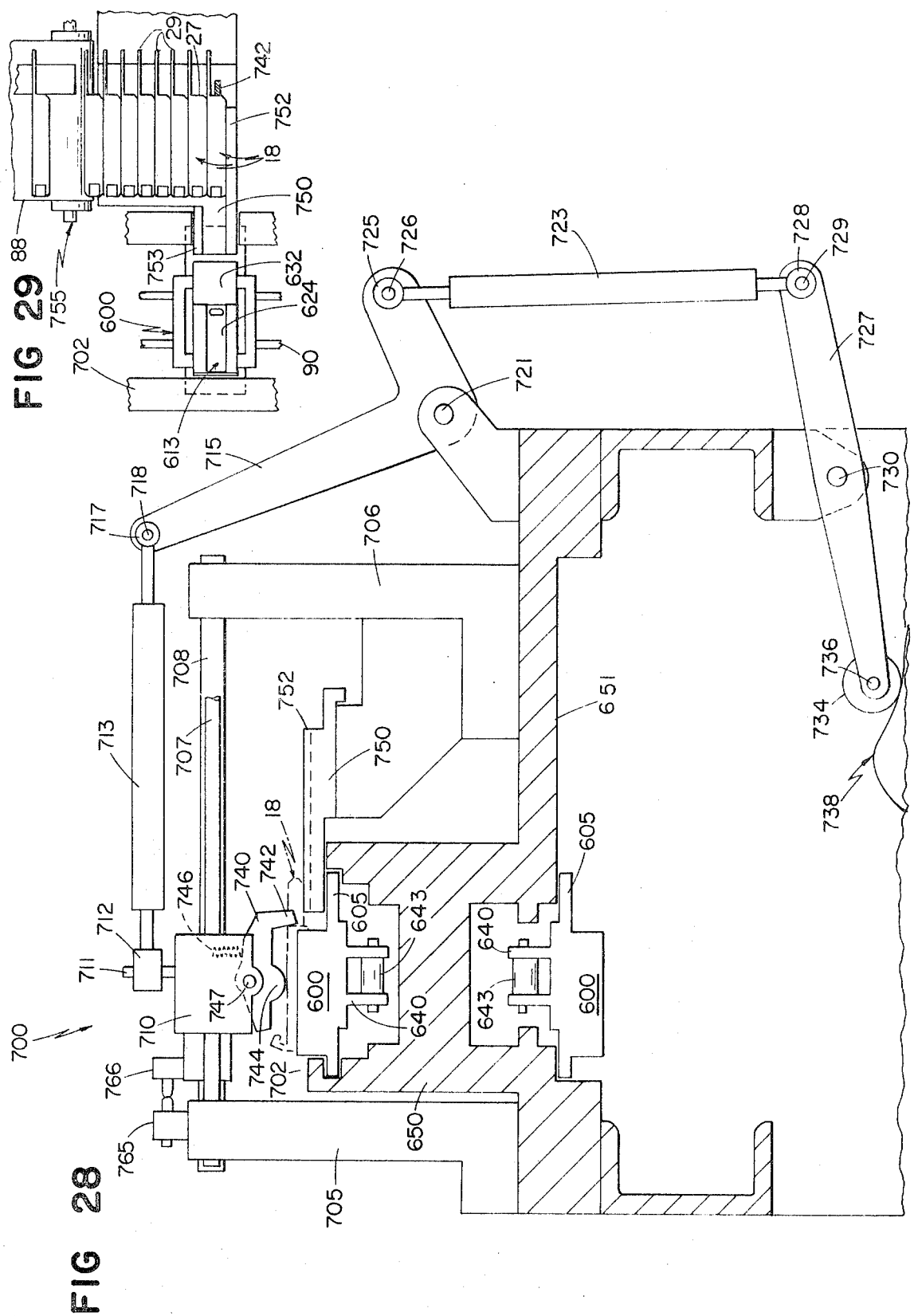

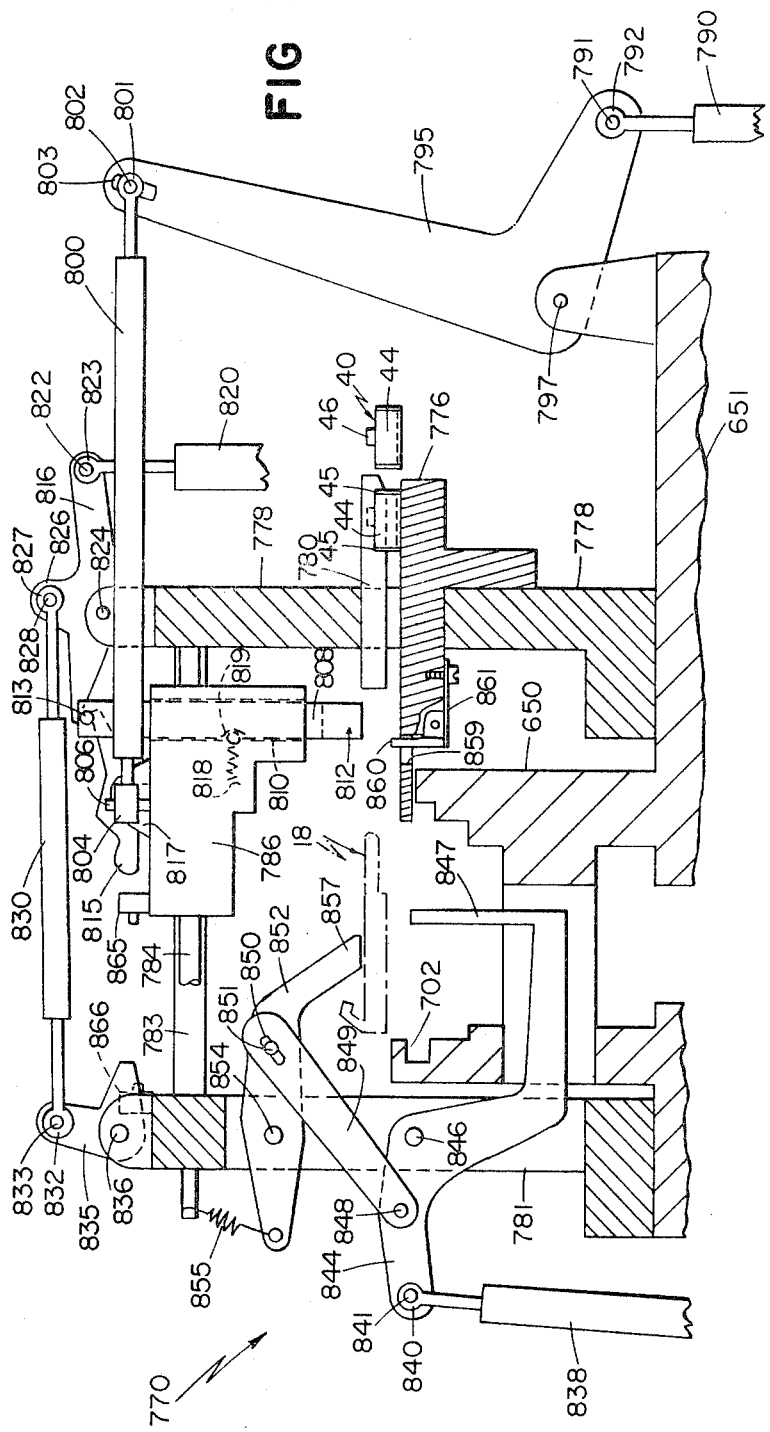

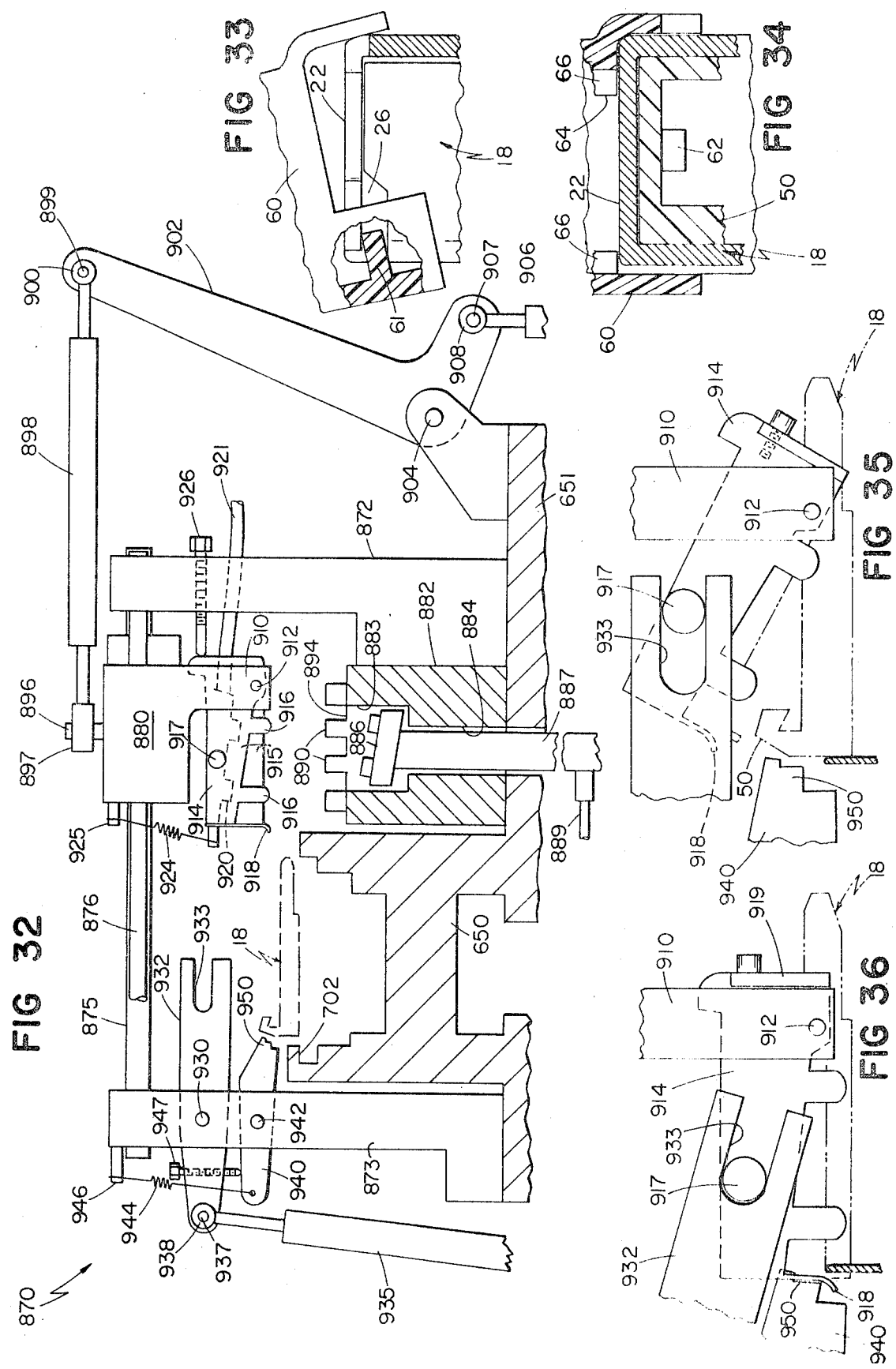

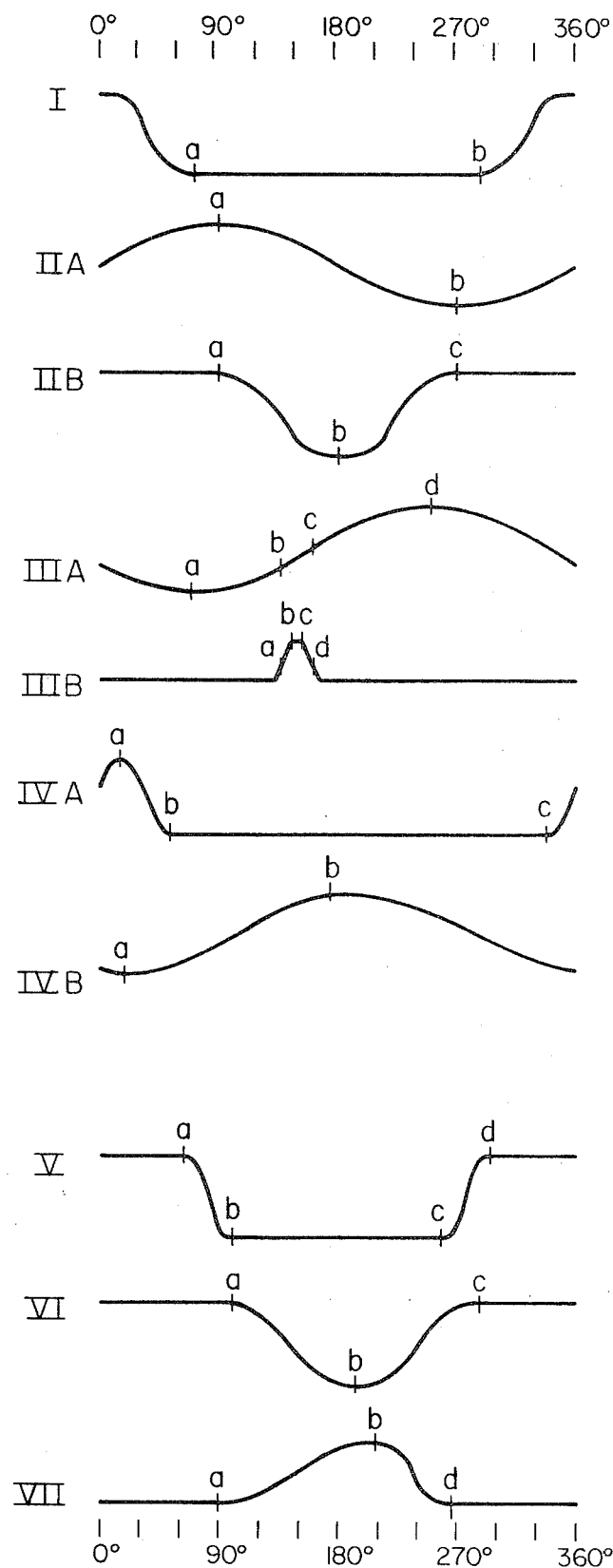

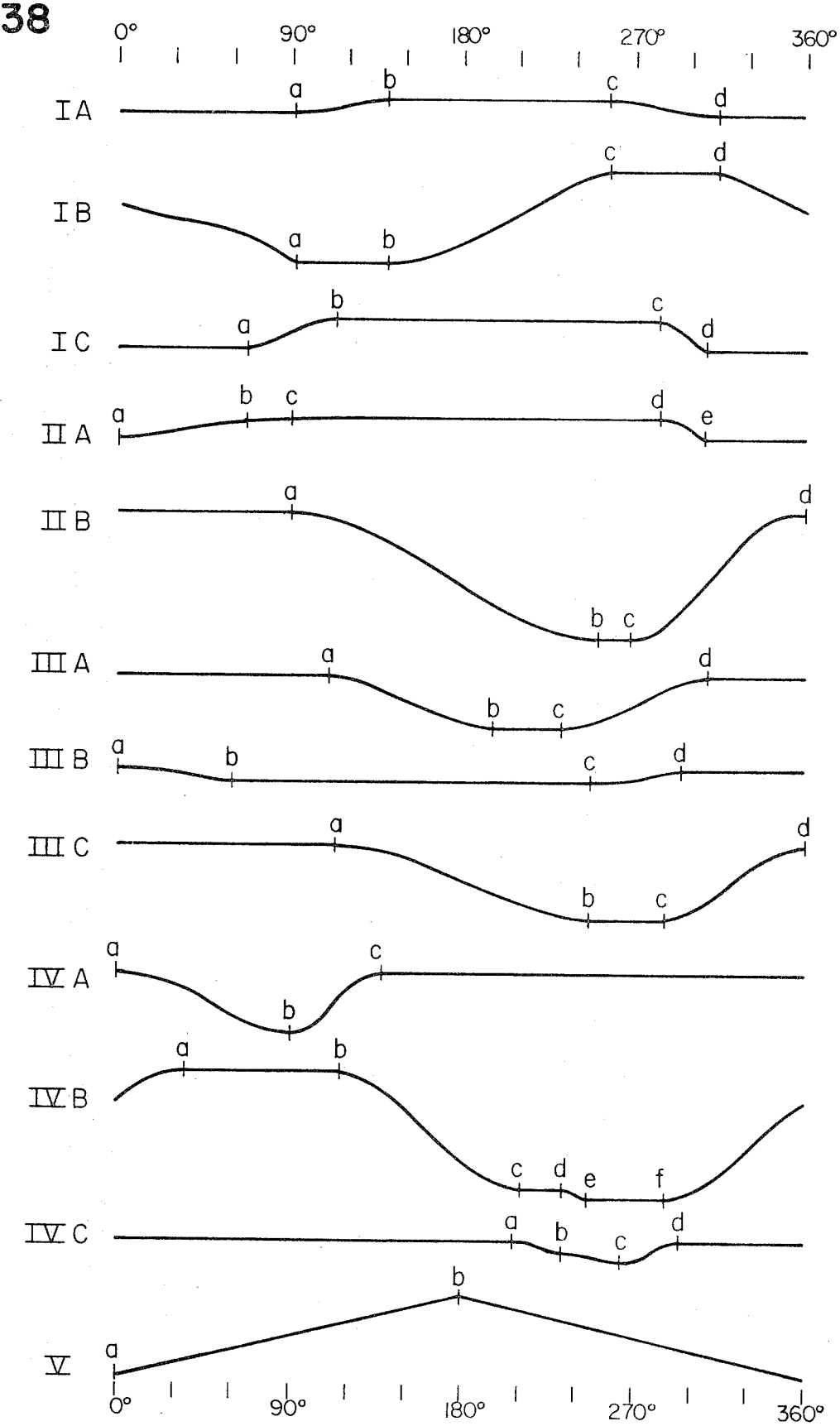

United States Patent Office 3,588,988
Patented June 29, 1971

3,588,988
METHOD AND MACHINE FOR ASSEMBLING A DISPENSER
Richard Joseph Maguire, Scituate, Mass., assignor to The Gillette Company, Boston, Mass.
Filed Oct. 24, 1968, Ser. No. 770,161
Int. Cl. B23p *17/00, 19/02;* B23q *7/10*
U.S. Cl. 29—400
59 Claims

ABSTRACT OF THE DISCLOSURE

Method and machine for assembling a cartridge-type dispenser (e.g., for dispensing injector razor blades) including a magazine and components therefore, comprising indexing a first nest containing the magazine past a first series of stations for loading a first plurality of components (e.g., blades, spring, and end plug) into the magazine, transferring the magazine to a second nest, and indexing this nest past a second series of stations for loading a second plurality of components (e.g., a blade dispensing member and a used blade compartment) onto the magazine. There are described procedures for indexing the nests at relatively controlled speeds, for protecting blade edges, for manipulating springs, for close assembly of plastic (end plug, used blade compartment) and metallic (magazine) pieces, as well as preferred nest configurations, indexing means, and loading assemblies.

---

This invention relates to automatic assembly techniques. In particular, the invention relates to automatically assembling the various components of a cartridge, for example a cartridge for dispensing injector-type razor blades.

An injector razor blade cartridge, such as that shown in FIGS. 2 to 4, has been conventionally hand-assembled by time-consuming procedures compatible with the configuration and material of the various parts. For example, in the embodiment shown in FIGS. 2–4, there are several fragile plastic elements, of complex shapes.

Rupture of these plastic elements can occur under only a moderately excess pressure, particularly since some, such as the used blade compartment, must be made to press-fit with metallic elements, and hence supply all the "give" during assembly. Another protection problem is that arising from the necessity to avoid contact with the sharpened edge of the blade, resulting in hazardous irregularities in the cutting edge. Also, since the blades are so thin, they can be susceptible to bending pressure and, additionally, are difficult to count. Rapid automatic manipulation of the spring component of the cartridge is difficult because of its unsual shape.

Of equal importance with avoiding damage to the parts is that any automatic assembly procedure should enable the elements to be assembled more quickly than is possible with hand assembly. To this end, at least about 60 razor blade holders per minute is considered an adequate output. That the construction of the holder would seem to demand a successive, rather than a contemporaneous, assembly of elements further complicates matters, as does also the close tolerances between the elements to be assembled.

It is therefore an object of this invention to provide a method and apparatus for automatically assembling an injector razor blade cartridge without damage to its various parts.

Another object is to provide methods and apparatus for assembling the fragile plastic members of an injector blade cartridge to metallic and other plastic members thereof while protecting protruding portions of these plastic members from rupture and weaker portions from undue strain.

Another object is to provide methods and apparatus for feeding and loading an accurately fixed number of blades from a continually replenished source into an injector cartridge without damaging the sharp edges of the blade.

Another object is to provide a method and apparatus for continually feeding a single spring selected from a continually replenished source and loading it into an injector cartridge so as to apply spring pressure to the blades in the assembled cartridge.

Another object is to provide novel and improved methods and apparatus for joining plastic and metallic elements of complex shape and close tolerances into various press-fitting relationships.

Still another object is to provide simple and reliable production control devices for automatically warning of or preventing repetition of defective or incomplete assemblies.

A still further object is to provide a method and apparatus which achieves all of the above objects while producing at least 60 assembled cartridges per minute of operating time.

Another object is to provide novel and improved methods and apparatus for cartridge assembly.

The invention features apparatus for assembling a cartridge-type dispenser for holding a number of elements and dispensing them, e.g., one at a time. The cartridge includes a magazine, open at one end, and components therefor including a plurality of elements to be dispensed from the magazine, a spring or similar clamping means for maintaining these elements securely against a wall of the magazine, an end plug sealing the open end of the magazine, a dispensing member which feeds elements from the magazine, and a used element compartment for holding used elements. Apparatus for assembling the elements spring, and end plug into the magazine includes a nest having a first chamber for receiving the magazine and an adjacent second chamber for receiving the magazine components for insertion into the magazine, a magazine feeding assembly which deposits a single magazine into the first chamber with the open end of the magazine facing the second chamber, at least one element feeding assembly which feeds elements into the second chamber, a spring feeding assembly which feeds a single spring into the second chamber on top of the elements, a first loading assembly which inserts the elements and spring into the magazine, an end plug feeding assembly including a second loading assembly which inserts an end plug into the open end of the magazine, and indexing means for advancing the nest between assemblies and stopping the nest in alignment with each assembly. Apparatus for assembling, onto this partially assembled magazine, the dispensing member and the used element compartment includes another nest for securing the magazine during assembly operations, a third loading assembly which secures a magazine into that nest, a fourth loading assembly which secures the dispensing member onto the magazine while at least momentarily lifting the elements off the magazine wall against pressure of the spring, a fifth loading assembly which secures the used element compartment onto the magazine, and indexing means for advancing the nest between these assemblies and stopping it in alignment with each assembly.

The invention features further structures and methods enhancing the overall rapidity, efficiency, and precision with which the components of the cartridge may be assembled, some of which relate particularly to the assembly of an injector razor blade cartridge, which will be later described. The invention is particularly applicable to such assembly, and is designed particularly to facilitate the manipulation of the complex-shaped components which comprise an injector razor blade cartridge. An injector razor blade cartridge which may be assembled in accordance with the present invention includes a metal magazine having one end open for inserting the various components and a bayonet at the opposite end for engaging with an injector razor to feed blades thereto; a number of single edge razor blades which lie along one wall (hereinafter, the "dispensing wall") of the magazine and are dispensed, through an opening in the magazine, to a razor; a spring which maintains the blades against the dispensing wall; a plastic end plug which seals the open end of the magazine after the blades and spring have been inserted; a dispensing member which slides through a groove in the dispensing wall to feed blades singly from the magazine; and a used blade compartment (UBC) which is attached to the magazine for receiving and safely maintaining used blades. While some features of the present invention relate only to components of this cartridge or structures nearly identical with them, it will be apparent that other features are of broader application.

In one broad aspect, the invention features apparatus for assembling a cartridge including a magazine, a first plurality of components to be inserted into the mgazine, and a second plurality of components to be attached onto the magazine, this apparatus comprising a first nest structured to secure the magazine for insertion of the first plurality of components, a second nest structured to secure the magazine for attachment of the second plurality of components, means for indexing the first nest through a plurality of stations for assembling the first plurality of components, means for indexing the second nest through a plurality of stations for assembling the second plurality of components, and at least one sensor between the indexing means for controlling the relative speeds of the indexing. In a preferred embodiment, this sensor includes two sets of sensing elements, positioned at two positions along a conveyor leading, generally, from the first nest to the second nest, to sense the end of a line of contiguously arranged magazines in transit on the conveyor, and operative to increase the ratio of the first nest indexing speed to the second nest indexing speed when the end of the line is not in front of either sensor, to decrease the ratio when the line extends past both sensors, and to maintain the ratio so long as the line ends somewhere between the sensors.

Another aspect relates to the manipulation of blades and features a method of advancing a single edge razor blade through an opening into a dispenser without damaging the sharpened end of the blade, which comprises maintaining the dull edge of the blade against guide structure having a magnetized surface aligned with the dispenser opening while advancing the blade along this magnetized surface into the dispenser.

The invention further features a method for joining a flexible element and a press-fitting rigid element, such as by inserting a rectangular portion of a plastic end plug into a rectangular chamber within a metal magazine without damaging the somewhat fragile plastic element, the method comprising advancing one element toward the other (e.g., the end plug toward the magazine) until contact is made, and only then applying a force against the elements sufficient to bring them into a complete press fit. Advantageously, the means for advancing the elements may be mechanical, and the superseding means for achieving the press fit may be pneumatic, such as a normally inoperative piston appropriately secured to the mechanical drive means., Another feature is a nest for securing a magazine during insertion thereinto of a plurality of components through an opening at one end of the magazine, this nest including a first chamber and an extending adjacent second chamber, the first chamber including structure for securing the magazine therein with its said opening facing the second chamber, the second chamber having its lower surface upwardly displaced from the lower surface of the first chamber adjacent the magazine so as to be aligned with the opening, and the second chamber also having an upright surface inwardly displaced from the adjacent upright wall of said first chamber so as to be aligned with said opening; and the plurality of components are deposited in the second chamber against the displaced surfaces and advanced along these displaced surfaces into the magazine. Where these components are metallic (such as blades), the inwrdly displaced wall may be magnetized to maintain the components (e.g., the dull edges of the blades) against it during insertion into the magazine; and, another magnet can be placed in the first nest chamber to further orient the metallic components after they have entered the magazine (again, for protection of the blades). Other preferred nest features include fingers for holding and positioning the blades in the second chamber, removable for insertion of blades into the magazine; and, an elevator beneath the first chamber to lift the magazine straight up out of the chamber (e.g., for unloading purposes).

The invention also includes several preferred indexing means for advancing a nest from one assembly station to the next, stopping each nest simultaneously at a station, performing an operation on the magazine in the nest, and then advancing the nest again. The nests for securing the magazine during insertion of the spring elements and end plug are arranged circumferentially on a rotating disc, while the various assembly stations are arranged on a stationary platform, adjacent the periphery of this rotating disc, so that adjacent stations are aligned with adjacent nests for carrying out the operation at that station.

A different indexing means is employed to index the second nest, which secures the magazine for attachment of the element-dispensing member and the UBC. This means comprises a chain, with nests aligned and secured at equally spaced positions along the chain. The various assembly stations are located on a stationary platform adjacent the chain, the spacing between adjacent stations matching the spacing between nests on the chain. The chain is indexed, moving each nest between adjacent stations, by means of a clutch and a reciprocating drive means, the clutch being operated to engage the chain with the drive means during forward movement of the drive means, thus moving the chain and nests, and to disengage the chain from the drive means during return or recocking movement of the drive means. A different nest is also described with reference to assembly of the dispensing member and UBC, including a chamber which secures the magazine but permits a portion of it to overhang a lowered runway surface adjacent the chamber and between it and the assembly station. This runway and overhang is utilized, e.g., to slide a dispensing member onto the magazine without having to lift the magazine. The nest also includes an adjustable guide block, upon which the runway and chamber are secured, which is aligned with each station, upon arrival, by guide means located at the station. In a preferred embodiment, the nest guide block is positioned between two spaced upright members, and separated from one member by springs urging the guide block against the other member; the guide means operates against these springs to align the magazine-securing chamber.

In a preferred embodiment of a magazine-loading assembly, for loading the magazine into a nest for subsequent insertion of the blades, spring, and end plug, the loading assembly includes a chute for feeding a stack of magazines to a retaining platform positioned above the nest and laterally displaced therefrom; loading structure adjacent this retaining platform, including a loading chamber vertically aligned with the nest, communicating therewith, and defined by a stationary vertical wall, and an inwardly spring-urged opposing vertical wall able to be displaced outwardly against this spring to support a magazine between the walls, a first pusher arm to push the lowermost magazine from the retaining platform horizontally into the loading chamber including a trailing portion supporting the remainder of the magazine stack; and a second pusher arm to push the magazine downwardly through the loading chamber, sliding between the stationary wall and the flexible wall into the nest.

For feeding blades to the nest for later insertion into the magazine, a preferred feeding assembly comprises a chute supporting a vertical stack of blades on a horizontal platform having a channel directly below and longitudinally aligned with the blades, the blade stack straddling this channel; a blade pusher having a leading portion for contacting the blades which rides in the channel and extends above the platform for a distance equal to the total thickness of the predetermined number of blades to be inserted into the nest; a gate aligned with the horizontal platform high enough to pass only the predetermined number of blades; and structure for enabling the pusher to push this predetermined number of blades into the nest. If desired, magnets may be located at the chute, gate, and nest to maintain the dull edge of the blades thereagainst during operation of the pusher. A detector may be mounted just outside the gate including a detecting element which drops freely onto the blades during blade movement through the gate, and detecting means associated with this detecting element for measuring the vertical distance travelled by the detecting element from a fixed position to the blades, whereby the total number of blades beneath the detecting element may be counted.

A preferred form of spring for keeping blades in place in a cartridge is a sheet-form spring having a central convex portion, and a wing portion adjacent each side, the wings being for contacting the blades and the convex portion being sized to contact the opposite wall of the magazine. The complex shape of the springs presents unique handling problems in designing a pusher to contact, e.g., the lowermost spring in a stack and advance it into the nest. In a preferred embodiment, a first pusher including a leading portion sized to fit under the convex surface of the spring and a trailing portion of increased dimension sized to engage a portion of the edge of the springs drives the spring horizontally to a receiving magnet, and a second pusher including a leading portion for contacting the spring along its curved surface drives the spring, at a 90 degree angle to the movement of the first pusher, into the nest, on top of the already inserted blades. A detector may also be associated with the spring feeding station in the form of a vertically movable detecting element, positioned above the nest aligned with a spring in the nest, which is lowered onto the spring only on movement of the pusher arms sufficient to deposit a spring in the second chamber, and is associated with contact means responsive to the vertical drop of the detecting element whereby the absence of a spring or even the absence of a single blade may be detected.

The spring and blades are loaded into the nest by a horizontally reciprocating pusher which has a leading portion sized to engage the spring and the blades and drive them into the nest. Again, a nest such as previously described having inwardly and upwardly displaced walls makes this insertion particularly efficient. Means are also provided for removing the interfering nest fingers and depressing the spring during insertion of the spring and blades.

For carrying out the previously described preferred method for inserting an end plug, a preferred end plug loading assembly comprises a track for delivering a continuous supply of end plugs, oriented for insertion into the magazine, a loading platform for receiving the forwardmost end plug, a stop for aligning this end plug with the open end of the magazine, a horizontally reciprocating pusher sized to contact this forwardmost end plug, a piston rod secured at one end to the end of this pusher and at the other end to a piston head, a pressure chamber surrounding the piston head, mechanical means for driving the pusher, and hence the end plug, up to and into the magazine, and air-operated drive means operating on the piston head through the pressure chamber to drive the piston with the pusher, after the end plug and magazine make contact, in order to insert the end plug into a press fit with the magazine.

In the preferred apparatus embodiment, after the blades, spring and end plug have been inserted into the magazine, the partially assembled cartridge is transferred to a second nest. In one embodiment, this is achieved by a conveyor leading to the second nest and an unloading apparatus comprising a pivotal arm with a vacuum chuck picking up a partially assembled magazine while the first nest is stopped and transferring the magazine by pivotal movement of the arm to the conveyor whereupon suction is shut off in the chuck. A detector may be mounted within the vacuum chuck for determining the presence of a magazine during movement of the pivotal arm from the nest to said conveyor, and for determining the absence of a magazine during movement of the pivotal arm away from the conveyor. The magazine is then deposited, from this conveyor, onto a loading platform, the conveyor being periodically indexed, as a magazine is advanced from the loading platform to the second nest, for a distance at least slightly greater than the width of a magazine. This procedure thus stacks up the magazines, in contiguous fashion, on the conveyor and platform.

In a preferred embodiment, the magazine is loaded into a chamber in the second nest, this chamber being enclosed on three sides, and sized to receive the magazine longitudinally through its open end and to support the magazine, by a loading assembly comprising a loading platform adjacent the nest for aligning the magazine longitudinally with the magazine-securing chamber, the end plug facing this chamber, and structure for advancing the magazine into the chamber comprising a block sliding on a track extending between the loading area and the nest and a rocker centrally pivotally connected below and to the block; the rocker includes a semicircular vertically projecting portion adjacent the pivot, and a depending flange toward the rear portion of the rocker, which is spring-urged downward about the pivot to engage the flange with the magazine; the first portion is spaced from the magazine during movement of the magazine, and is pivoted into the magazine when the leading end of the magazine is advanced into the chamber, by small further movement of the block, whereby the magazine is secured into the bottom of this chamber.

A preferred dispensing member assembly apparatus is described with reference to an injector blade cartridge having a dispensing member including an element-contacting portion structured to slide along the dispensing wall within the magazine for dispensing one blade, and a second portion disposed outside of the magazine, whereby the dispensing element is gripped and moved along the dispensing wall, and wherein the magazine includes a slot adjacent one end of the dispensing wall for inserting the dispensing member into position with the elements. This preferred apparatus includes a loading platform for receiving a blade dispensing member with a first portion aligned with the magazine receiving slot, a vertically adjustable gripper including an inverted U-shaped member for engaging the second portion of the dispensing member, means for moving the gripper alternately between the loading platform and magazine, means for lowering the gripper into engagement with the dispensing member during movement of the gripper from the loading area to the magazine, and means for simultaneously lifting the blades off the dispensing wall and clamping the dispensing magazine in the nest chamber while the first portion of the dispensing member is advanced through said receiving slot into the magazine. For rapid attachment of this dispensing member, the means for raising the blades off said dispensing wall includes reciprocating structure operating through an opening in the nest and an opening in the magazine dispensing wall; this reciprocating structure is driven up through these openings, thereby lifting the blades off said dispensing wall, while advancing the dispensing member toward the magazine; the reciprocating structure is thereafter immediately withdrawn as soon as a portion of this dispensing member is advanced adjacent the blades, whereby the nest may be instantaneously indexed away from the loading apparatus upon complete attachment of the dispensing member.

Assembly of the cartridge is completed by securing a used blade compartment to the magazine, preferably by inserting a wall of the magazine between an abutting portion of the used blade compartment and a lug secured to the used blade compartment, the distance between the lug and abutting portion being only slightly greater than the thickness of the wall to be inserted therebetween, the magazine including a recess adjacent this inserted wall at a corner of the magazine for receiving the lug, and the lug being located at a corresponding corner of the used blade compartment. In the preferred method, the steps comprise securing the magazine with the wall to be inserted uppermost, advancing the used blade compartment toward the magazine with the lug aligned for insertion into the recess, canting and tilting the used blade compartment such that the perpendicular adjacent sides nearest the lug are lowermost, advancing the used blade compartment toward and above the magazine until the lug contacts the recess, and continuing this advance while gradually reducing cant and tilt to secure the used blade compartment onto the magazine.

At each of the described stations, various detectors may be arranged to determine whether a particular assembly step has been completed. Advantageously, two detectors are employed—one for determining if, e.g., the stroke of a pusher has gone far enough to insert the particular cartridge component into the cartridge; and one for determining whether the stroke has travelled too far, indicating no component was fed to the pusher prior to the stroke. The timing of the various stations is carried out by appropriate cams, mounted according to procedures well known in the art.

Other objects, features and advantages will appear from the following description of a preferred embodiment of the invention, taken together with the attached drawings thereof, in which:

FIG. 1 is a plan view, somewhat diagrammatic, of an apparatus for assembling injector razor blade cartridges, embodying the present invention;

FIG. 2 is a side view, in section, of an assembled injector razor blade cartridge;

FIG. 3 is a top view, in section, of an assembled injector razor blade cartridge, taken along the line 3—3, shown in FIG. 2;

FIG. 4 is an exploded view of the elements of an injector razor blade cartridge, shown larger than actual size, the UBC being partially broken away;

FIG. 5 is an enlarged plan view of part of the apparatus of FIG. 1;

FIG. 6 is a perspective view of a nest for use in the apparatus of FIG. 5;

FIG. 7 is a side sectional view of the nest of FIG. 6, taken along line 7—7 of FIG. 6, and including also, in phantom, devices acting on the nest;

FIG. 8 is an end sectional view of the nest of FIG. 6, taken along line 8—8 of FIG. 6, and including devices acting on the nest as shown in FIG. 7;

FIG. 11 is a side elevational view, partially broken away, of an embodiment of a blade feeding assembly according to the present invention;

FIG. 12 is an end elevational view of the assembly of FIG. 11;

FIG. 13 is an enlarged plan view of a nest and a portion of the blade feeding assembly adjacent thereto;

FIG. 14 is an enlargement of the encircled area of FIG. 12;

FIG. 15 is a side elevational view of an embodiment of a spring feeding assembly according to the present invention, showing an adjacent nest in phantom;

FIG. 16 is a front end elevational view of the assembly of FIG. 15;

FIG. 17 is an exploded view of the spring, the spring pusher, the spring gate and the spring stop employed in the assembly of FIGS. 15 and 16;

FIG. 18 is an enlarged view of the spring, spring pusher, and gate, along line 18—18 of FIG. 16;

FIG. 19 is a side elevational view, partially broken away, of an embodiment of a spring and blade loading assembly according to the present invention;

FIG. 20 is a plan view, with portions broken away, and with an adjacent nest in phantom, of part of an embodiment of an end plug loading assembly according to the present invention;

FIG. 21 is a partial side elevational view of part of the embodiment of an end plug loading assembly according to the present invention;

FIG. 22 is a perspective view of an end plug and a mating portion of a magazine, for assembly according to the embodiment of FIGS. 20 and 21;

FIG. 25 is a perspective view of another nest for use with the apparatus of FIG. 1, including an attached portion of an indexing chain;

FIG. 26 is a side sectional view showing the nest of FIG. 25 along line 26—26 of FIG. 25, and also the indexing chain and a portion of an adjacent nest;

FIG. 27 is a diagrammatic view of a portion of an indexing means for use with the apparatus of FIG. 1, and the nest of FIG. 25;

FIG. 28 is a side elevational view of an embodiment of an assembly for loading a magazine into a nest of FIG. 25, according to the present invention;

FIG. 29 is a plan view of a portion of the embodiment of FIG. 28, showing transfer of magazines from conveyor to nest;

FIG. 30 is a side elevational view, partially in section, of an embodiment of a pusher loading apparatus, according to the present invention;

FIG. 31 is an enlargement of a portion of the apparatus of FIG. 30, together with a partially assembled cartridge, a portion of the latter being broken away;

FIG. 32 is a side elevational view, in partial section, of an embodiment of a used blade cartridge loading assembly according to the present invention;

FIG. 33 is an end sectional view of a partially loaded magazine and used blade compartment;

FIG. 34 shows the magazine and used blade compartment of FIG. 33 in the loaded position;

FIG. 35 is a side elevational view of a partially loaded magazine and used blade compartment in the same position as in FIG. 33;

FIG. 36 shows the magazine and used blade compartment of FIG. 35 in the loaded position;

FIG. 37 is a camming diagram showing the timing of the operations of some portions of the apparatus of FIG. 1, and FIGS. 5–24; and, FIG. 38 is a camming diagram showing the timing of the operations of other portions of the apparatus of FIG. 1, and of FIGS. 25–36.

Figure 9:
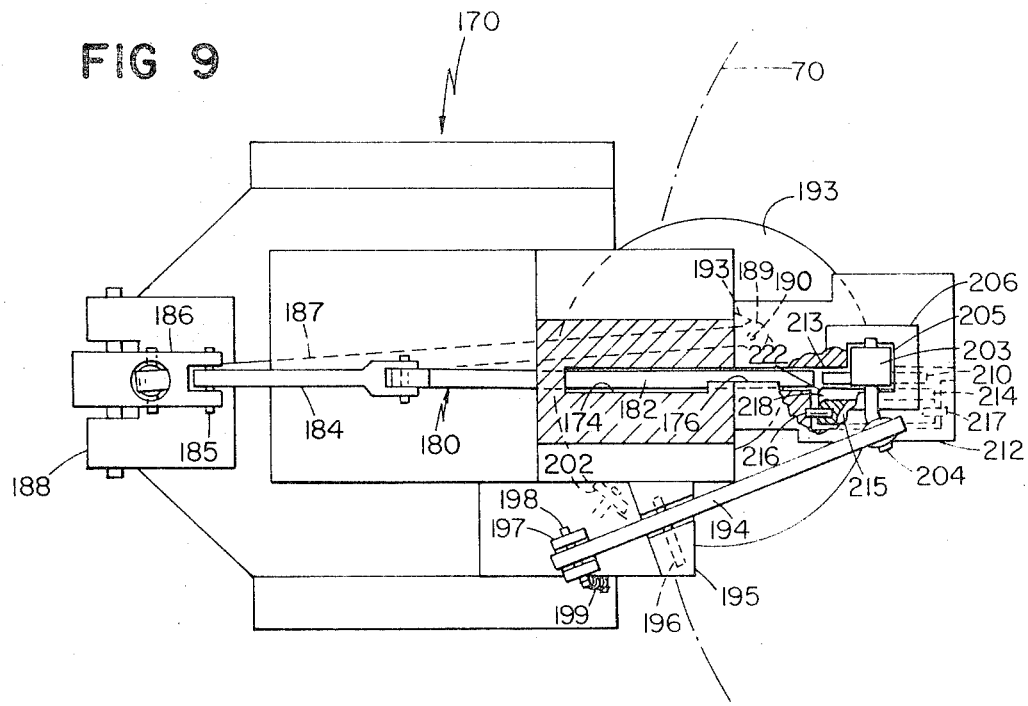
FIG. 9 is a plan view, with a portion broken away, of an embodiment of a magazine loading assembly according to the present invention.

In FIG. 1 there is shown an injector razor blade cartridge assembling apparatus 10 including a first assembly area 12 and a second assembly area 14.

Referring to FIGS. 2 to 4, the cartridge to be assembled consists of a generally rectangular metal magazine 18 including an open end 19, a longitudinal groove 20 through blade dispensing wall 21, an opposite longitudinal wall 22 including a notch 23 in its front edge 24, an elongated slot 25 adjacent open end 19, recess 26 in face 27 adjacent side 22, a blade opening 28, and a razor alignment guide or bayonet 29; blades 30, each having a dull edge 31, a sharpened edge 32, and a diagonal notch 34 at each corner; a steel leaf spring 36 having a curved central portion 37 and adjacent wings 38; metal blade pusher 40 including a blade indexer 41, sliding inside groove 20 of magazine 18 and including a reduced thickness portion 42 sized to push one blade only through blade opening 28, linking arms 43, handles 44, including flared portions 45, slidingly engaging the sides of magazine 18 perpendicular to blade dispensing wall 21 of magazine 18, and a stop 46 for limiting the sliding movement of the pusher; a plastic end plug 50 including a rectangular portion 52 sized to press fit through open end 19 into magazine 18, flush with the end thereof, an inner rectangular bore 53, a used blade receiving slot 54 in wing 55, a lug 56 projecting from wing 55 and mating into slot 25 of magazine 18 upon engagement, and a blade aligning guide 57, sized to slide between the sharp edge 32 of blades 30 and the adjacent side of magazine 18; and a plastic used blade compartment (UBC) 60 including a first mating lug 61, which mates into recess 26 of magazine 18, a second mating lug 62, which mates into rectangular bore 53 of end plug 50, depending surface 63 of UBC 60 serving to seal bore 53, an opening 64 which communicates with wing 55, lug 62 being placed to engage the upper edge 65 of opening 64 with the adjacent surface of wing 55, opening 64 allowing access from used blade receiving slot 54 to the inside of UBC 60, guide 66 which maintains wing 55 of end plug 50 adjacent opening 64, depending finger 67 which mates with a slot (not shown) in side 21 of magazine 18, blocking lugs 68, for engaging stop 46 of pusher 40, limiting its sliding movement, and locking surface 69 which rests upon side 22 of magazine 18 when lug 61 is engaged into recess 26.

Referring now again to FIG. 1, first assembly area 12 includes a rotating disc 70, having a series of nest positions 72, which rotate past the magazine loading station 74, blade feeding stations 76, 78, spring feeding station 80, blade and spring loading station 82, end plug loading station 84, and unloading station 86 for transferring partially assembled cartridges onto conveyor 88. Second assembly area 14 includes a chain 90, having a number of nest positions 92, which move past a magazine loading station 94, for transferring partially assembled cartridges from conveyor 88, a pusher loading station 95, a UBC loading station 96, and an assembled cartridge unloader 97. Conveyor 98 carries the assembled cartridges away from the assembly areas.

In FIG. 5, there is shown an enlarged view of the first assembly area 12, several nests having been removed for purposes of illustration. In addition to the stations enumerated, there are provided blank stations 99 which may, e.g., be fitted with switches, etc.

Referring to FIGS. 5 to 8, each steel nest 100 is secured at a nest position 72 on rotating disc 70 by three corner screws 101, threaded through appropriate openings 102 in nest 100 and openings 103 in disc 70; nest 100 is positioned thereby with a rounded edge 104 following the peripherical edge of disc 70. Nest 100 includes a base 105, first longitudinal chamber 106 having a reduced width portion 107 for receiving razor alignment guide 29 of magazine 18, and an adjacent second longitudinal chamber 108 for receiving blades 30 and spring 36 prior to insertion thereof into magazine 18. One vertical wall 110 of chamber 108 is inwardly displaced from the adjacent vertical wall 112 of chamber 106 by an amount slightly greater than the thickness of side 21 of magazine 18, which is placed adjacent wall 112 (FIG. 7); the opposed interrupted vertical wall 114 of chamber 108 is aligned with the adjacent opposed vertical wall 116 of chamber 106. Each wall 110, 112 includes a magnetic portion, 117, 118, respectively, for urging the dull edges 31 of the blades toward those walls during assembly, chamber 108 being slightly wider than blades 30. Vertical wall 114 is interrupted by spaced notches 120, 122, each notch having a finger 123, 124, respectively, pivoted therein on pin 125, tension springs 126, 127 urging fingers 123, 124, respectively, toward the bottom wall 128 of chamber 108. Finger 124 includes, on its inwardly extending portion 129, a transverse notch 130 which engages a corner notch 34 of a blade 30 to align the blade. Finger 123 also has an inwardly extending portion 131, on the underside of which, facing edge 104, is a chamfer, allowing blades inserted into chamber 108 to bear upon and lift portion 131 sufficient to slide underneath it. Finger 123 then serves to maintain the inserted blades securely against bottom wall 128 during further indexing of the nest. Wall 116 of chamber 106 includes a slot 132, in which is secured a leaf spring 133, carrying a stop 134, normally urged into chamber 106, to engage a side of magazine 18 and thus maintain it in chamber 106. The lower wall 138 of chamber 106, which is downwardly displaced from lower wall 128 of chamber 108 by an amount slightly greater than the thickness of the side of magazine 18 normally adjacent lower wall 138, also includes an elongated slot 140, through which elevator platform 142 is free to move. As can be seen in FIG. 7, elevator 144 includes a T-shaped slide 144, topped by platform 142, this slide being slidingly engaged in bore 147 of nest 100, platform 142 being urged, by compression springs 148, which are secured to nest 100, to remain out of chamber 106 and against base 105, allowing magazine 18 to lie normally on lower wall 138. Roller 149 rotates about shaft 150 which is rotatably secured in a bore 151 of T-shaped slide 146 for vertical movement therewith; a rotating camming surface may be positioned below disc 70, at an appropriate station (e.g., at the unloading station 86 of the first assembly area) to raise roller 149 and hence lift magazine 18 at least partially out of chamber 106.

Fingers 123, 124 can be conveniently depressed by a vertically operated pusher 152 (FIGS. 7, 8), which may contain two rollers 154, 156, for simultaneous depression of fingers 123, 124, removing their portions 131, 129, respectively, from chamber 108. A vertically operated clamp 158 is often employed to secure magazine 18 tightly against lower wall 138 during various assembly steps (such as at the blade and spring loading, and end plug loading stations).

Referring again to FIG. 5, a series of nests 100 are arranged, equally spaced, about disc 70, which is supported above platform 165 and rotates with respect to it, the individual assembly apparatus being secured onto platform 165 adjacent disc 70. Associated with the various stations are a number of rotating cams (only an illustrative few of which are shown in the later figures) for carrying out, in proper sequence, the operations at each station. Timing diagrams for these cams appear in FIGS. 37 and 38, and will be discussed later with reference to these figures. In lieu of, or in cooperation with these cams, other devices such as switches, eccentrics, etc. may be employed to achieve the required operations. In operation, the disc is stopped while, simultaneously, a magazine is loaded into a nest at station 74, the previously loaded magazine is loaded with blades at station 76, the next previously loaded magazine is loaded with additional blades at station 78, and, similarly, operations are performed on proceeding magazines at stations 80, 82, 84, 86. At the completion of the longest operation, the disc rotates, indexing each magazine to its next station, and an empty nest to station 74. The entire operation is then repeated. A master cam, e.g., may be employed for indexing; typically, the time lapse for one complete indexing movement and completion of the longest operation is not greater than one second. A blower means (not shown) may be secured at station 168, below a portion of the unloading apparatus, for clearing out each recently unloaded nest by blowing air therethrough.

Figure 10:
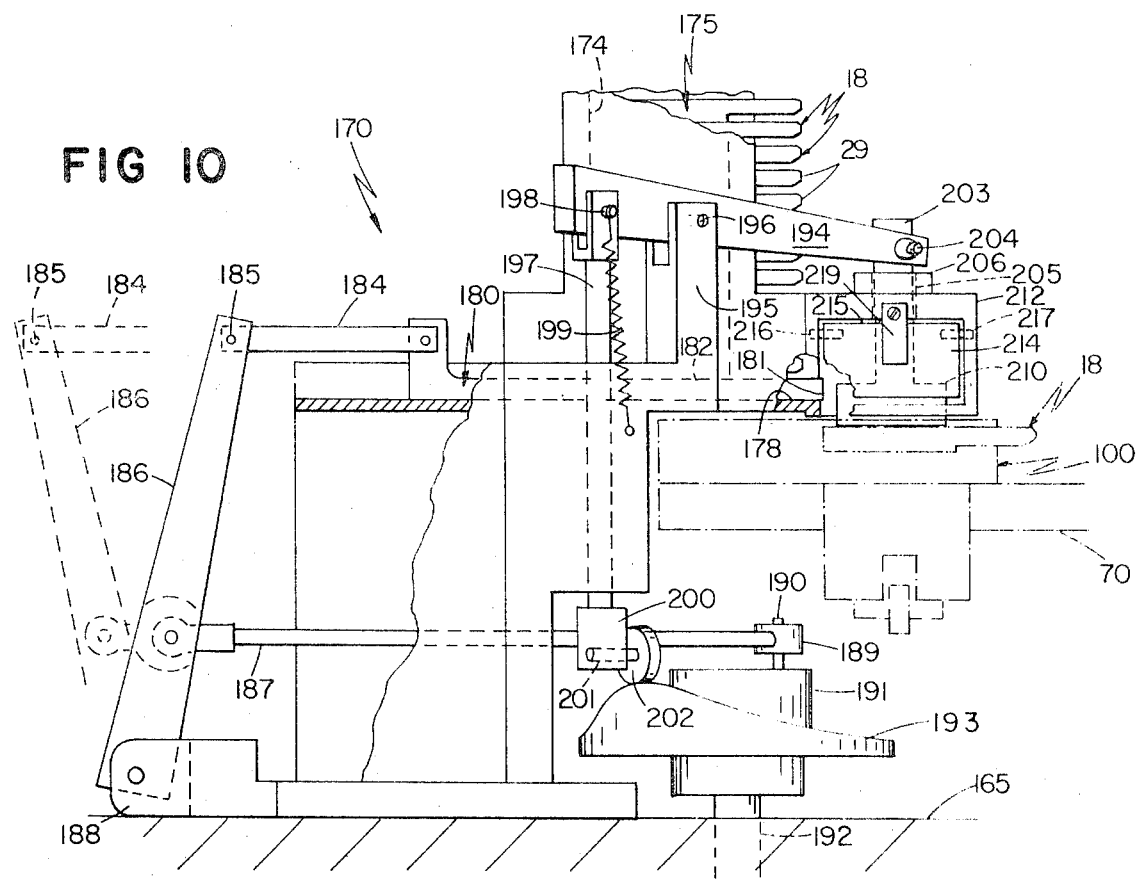
FIG. 10 is a side elevational view, with portions broken away, of the assembly of FIG. 9.

In FIGS. 9 and 10 there is shown the magazine loading assembly 170, which occupies station 74 (FIG. 1). Assembly 170 includes a chute 174 extending partially over nest 100 for delivering a stack 175 of magazines 18, including a reduced width portion 176 for accommodating blade guide 29 of magazine 18; and a retaining platform 178 for supporting the lowermost magazine. Horizontal pusher arm 180 includes a leading portion 181 sized to contact a magazine along the edges surrounding open end 19, and a trailing portion 182 for supporting the remainder of stack 175. Pusher arm 180 is secured by cross arm 184, through pivot pin 185, to lever 186, which is pivotally connected to drive arm 187, and pivoted to fixed support 188. Drive arm 187 is secured to coupling 189, which rotates about pin 190, eccentrically secured on rotating cylinder 191, which is driven through shaft 192 by appropriate drive means. Cam 193 is concentric with cylinder 191 and rotates therewith.

Lever arm 194 is pivoted to fixed support 195 by pin 196, and pivotally connected to vertically moving arm 197 through pin 198. Spring 199 extends between arm 197 and fixed support 195 and urges arm 197 downwardly. Arm 197 terminates in coupling 200, to which is secured pin 201, wheel 202 being rotatably secured at the other end of pin 201 and travelling about cam 193. Lever arm 194 is also pivotally connected to rod 203 by pin 204 and cross arm 202. Rod 203 extends through bore 205 in guide block 206, and terminates in vertically moving pusher block 210. Guide block 206 is mounted on frame 212, which has a hollowed interior communicating with platform 178 for receiving magazines between rigid guide wall 213 and pivoted guide wall 214; frame 212 also has an opposed slit for accommodating blade guide 29 of magazine 18. Guide wall 214 has a rounded pivoted portion 215, pivotally secured by pins 216, 217 to frame 212, and a lower inwardly extending portion 218 for contacting magazine 18. A leaf spring 219 urges guide wall 214 toward guide wall 213, holding magazine 18 in a press fit therebetween after it is fed, past rounded portion 222 of guide wall 213, between the guide walls.

In operation, after a nest has stopped beneath loading assembly 170, horizontal pusher arm 180 is moved, by rotation of cylinder 190, from a position shown in phantom at FIG. 10, horizontally to push one magazine 18 completely off platform 178 into the space between guide walls 213, 214, the communicating notch between platform 178 and frame 212 being shaped to allow movement of only one magazine; the remainder of the stack remains supported on the trailing portion 182 of pusher arm 180. As a magazine is being advanced between guide walls 213, 214, rotation of cam 193 removes pusher block 210 upwardly out of the path of movement of this magazine. As soon as the magazine is secured between guide walls 213, 214, pusher block 210 is moved vertically downward by further rotation of cam 193, between guide walls 213, 214; magazine 18 is thereby loaded, by block 210, down into chamber 106 of nest 100, which is aligned directly below pusher block 210, leaf spring 133 (FIG. 6) being deflected sufficiently to allow magazine 18 to be secured on the bottom wall 138 of chamber 106, and stop 134 retaining the magazine in nest 100 during withdrawal of the pusher block 210.

In FIGS. 11 to 14, there is shown a blade loading assembly 230. One such assembly occupies each of stations 76, 78, the stations being identical except that, in a preferred embodiment, four blades are delivered at station 76 and only three blades are delivered at station 78. The stations are adjustable to deliver any number of blades, two stations providing a greater leeway in the number of blades able to be fed.

Assembly 230 includes a vertical blade chute 235, slightly wider than a blade, within supporting structure 237, for delivering a vertical stack of blades 30 onto carbide covered tracks 238, which define therebetween a longitudinal slot 241, narrower than the width of a blade to allow the blade stack to rest on tracks 238, straddling groove 241. Magnet 243 is secured adjacent rear track 238 and also adjacent the blade stack, blades 30 being positioned in chute 235 with their dull edges 31 flush with magnet 243, and their sharp edges protected by reason of the greater width of chute 235.

Blade pusher arm 250 includes a leading portion 251, sized to slide in groove 241, and topped by a carbide lug 252 sized to slice exactly the required number of blades from the bottom of the blade stack and push these blades beneath gate 254, which is sized to pass only the required number of blades and carbide portion 252. The number of blades to be delivered may thus be selected by proper sizing of lug 252 and gate 254. For example, to deliver 3 blades .010 inch thick, the carbide lug 252 extends .027 inch above platform 238, and gate 254 is spaced .006 inch above lug 252. Blades may be conveniently loaded into chute 235 by spearing them, through the elongated center slot in each blade, onto a bayonet, introducing the bayonet into the chute, and thereafter withdrawing the bayonet.

Supporting block 256 includes a second groove 257 in which the trailing portion of arm 250 can slide. Arm 250 is secured, through pin 262, to drive arm 264, which terminates in coupling 265 carrying pivotally therein a pin 267 eccentrically mounted on rotating cylinder 269, rotated through shaft 270 by appropriate means (not shown). Supporting guide blocks 272, 274 enclose the upper side of arm 250, to maintain it in track 257. Forward movement of arm 250 is determined by the adjustment of coupling 265 and pin 267 on rotating cylinder 269.

Blade detector assembly 278 includes a floating wheel 279, pinned to a downwardly biased (by spring 280, secured to supporting structure 282) rod 283, downward movement of rod 283 being limited by spring support 284 and stop 285, which extends from supporting structure 237. Lever arm 287 is pivoted about pin 288, also secured to support structure 282, and includes at one end a contact 290, adapted to engage a second contact 291 upon rotation of lever arm 287; the opposite end of lever arm 287 is pivotally secured, by pin 293, to rod 283. Vertical drive arm 295 is secured, through pin 296 in block 297 to wheel 298, which travels about cam 300, the cam being concentric with cylinder 269 and rotating therewith by means of shaft 270. Arm 295 terminates in a horizontal bar 301, through which is threaded screw 303.

In operation, rotation of shaft 270 causes arm 250, and hence leading portion 251 to move horizontally, carbide lug 252 slicing off the required number of blades, pushing them through gate 254, and into chamber 108 of nest 100, where the dull edges 31 are retained against wall 110 of chamber 108 by magnet 117 thereby protecting the sharpened edges 32. The blade movement is stopped by engagement of notch 130 of finger 124 with the opposing corner 34 of blades 30. During movement of blades 30 into chamber 108, finger 123 is raised by the blades pushing against the chamfer on the underside of finger 123.

As blades 30 clear gate 254, drive arm 295 is moved upwardly by cam 300, lifting threaded screw 303 off lever arm 287, allowing floating wheel 279 to drop onto the moving blades. The contacts 290, 291 and screw 303 are set so that if the required number of blades is being delivered by pusher arm 250, wheel 279 will not drop far enough to pivot contact 290 into contact 291, whereas any less than that number will allow contact to be made. Upon contact, an appropriate signal is transmitted which may, e.g., store the error in a memory circuit for later rejection of the cartridge, or more preferably, shut down the first assembly area for discovery and correction of the source of the erroneous blade feed.

After the blades have been fully inserted into chamber 108, pusher arm 250 retracts, upon further rotation of shaft 270, all the way back past the blade stack, into position for inserting blades into the next indexed nest.

In FIGS. 15 to 18 there is shown the spring feeding assembly 330, which occupies station 80 in the first assembly area. Assembly 330 includes a vertical chute 331 for supporting a stack 332 of springs 36, and a first horizontal pusher arm 333 secured, through pivot pin 334, to drive arm 336, which is normally urged toward spring stack 332 by spring 338 which is secured to support structure 340. Drive arm 336 is also rigidly secured to pin 341, which rotates in stationary guide 342; pin 341 is also rigidly secured to block 344 which carries cam roller 346 on pin 347, roller 346 following cam 350, which rotates through drive shaft 351 by appropriate drive means (not shown).

A second horizontal pusher arm 354, moving at a 90° angle from pusher arm 333, is secured, by pivot pin 355, to lever arm 358, which is secured, through pivot pin 360, to support structure 340. Drive arm 362 is pivotally connected to lever arm 358 by pivot joint 363, arm 362 terminating in rod end 365, secured to pin 367, which is eccentrically mounted on cam 350. Pusher arm 333 rides in guide slot 368 while the spring stack 332 is supported on adjacent platform 369, and terminates in pusher block 370 (FIG. 17), which includes a leading portion 372 sized to fit under spring stack 332, and a trailing portion 374 including carbide inserts 376a, 376b, 377, sized to contact, respectively, wings 38 and curved central portion 37 of a single spring 36, and sufficiently small to slide under the next spring 36 in the stack 332 (see FIG. 18), so that only one spring is fed at a time (into the paper, as shown in FIG. 18). The springs ride on leading portion 372, and are stopped by magnet 382, which retains the spring on withdrawal of arm 333. Gate 383 is further shaped to allow only one spring and the leading portion 372 of pusher block 370 to pass underneath.

Second pusher arm 354 slides in passageway 384 and terminates in a leading portion 385, shaped to accommodate a spring 36 exerting any additional pressure except that required to move the spring horizontally.

Rotating finger depressor 388 includes a leading block 389, rotating on arm 390, for pressing down on the extending portion of finger 123 to remove portion 131 of finger 123 from the path of movement of spring 36 until the leading wing 38 of the spring has gone past this finger; at that point block 390 is rotated back, enabling portion 131 to return to a position beneath center portion 37 of the spring 36. Rotating arm 390 is rigidly secured to crank arm 391, which is rotatably secured around crank pin 392, biased to support 340 by spring 393. Crank pin 392 is secured by rod end 396 to drive arm 397, which is vertically operated by arm 398, rigidly secured to pin 360 for movement with arm 358 upon eccentric movement of pin 367.

Detector 400 includes a detecting element 402, secured on a right-angle arm 403, pivotally secured to support 340 by pin 405, and normally maintained in a raised position, as shown in FIG. 15, by protruding element 408, which rides on pusher arm 354. Detector 400 is lowered, at the forwardmost point of the stroke of pusher arm 354, by the dropping of protruding element 408 into notch 410 of arm 354, whereby detecting element 402 will engage the top of spring 36 if the correct number of blades and a spring are present. Also secured on arm 403 is contact arm 412 (FIG. 16) which will make contact with electrical contact 414 if the detector 400 drops too far, i.e., if either a blade or a spring is missing.

In operation, leading portion 372 of pusher arm 333 slides underneath a spring 36, and trailing portion 374 engages, through carbide inserts 376a, 376b, 377, the wings and top of the bottommost spring, the trailing portion 374 of arm 333 supporting the remainder of the stack 332 of springs. When the spring is pushed adjacent magnet 382, second pusher arm 354 drives the spring past finger 123, which has been previously raised by finger depresser 388, onto blades 30, already in chamber 108 of nest 100. Portion 131 of finger 124 is then allowed to return, to take up a position partially underneath the spring, and on top of the blades. Meanwhile, detecting element 402 is lowered onto the inserted spring 36 by travel of element 408 into notch 410; this element may be made sensitive enough to detect the absence of a single blade (0.010 in. thick). Upon withdrawal of pusher 354, detecting element 402 is again lifted off spring 36, and the nest is free to index to the next position.

In FIG. 19, there is shown a spring and blade loading assembly 420 for loading the spring and blades into the magazine which occupies station 82 in the first assembly area. Assembly 420 includes a support structure 422 on which is mounted gear wheel 424 and concentric cams 425, 426, rotating with gear wheel 424. Shaft 427 is driven by appropriate means (not shown), turning drive gear wheel 429 and mating gear wheel 430, with its associated bevel gear 431, the rotation of which turns gear wheel 424, and hence cams 425, 426.

Assembly 420 includes a vertical arm 440 slidingly extending through guide bore 442 in support structure 422 and pivotally secured at one end, through pivot pin 444, to lever arm 445, which itself pivots about pin 446, also secured to support structure 422. Lever arm 445 is secured, through pivot pin 448, to drive arm 450, which extends through another guide bore 452 in support structure 422. Arm 450 is biased down by spring 453, which is secured to support structure 422; arm 450 terminates at pivot pin 455, which is also secured to cam roller 456, which follows cam 426.

At the opposite end of vertical arm 440 is rigidly secured cross-arm 460, which carries spring loaded magazine holder 158 (see FIGS. 7, 8) and rigidly mounted leaf spring depressor 159, which are aligned, respectively, with longitudinal chambers 106, 108 of nest 100. Arm 448 also carries, to the rear of spring depressor 159, member 152 (FIGS. 7, 8), carrying rollers 154, 156 for depression, respectively, of fingers 123, 124.

Horizontal pusher arm 465, which controls the insertion of the blades and spring, is pivotally secured by pin 468 to cross arm 469, which is in turn pivotally secured by pin 470 to drive arm 471, on which is mounted cam roller 472, which follows rotating cam 425. Drive arm 471 is pivoted about pin 463, and biased counterclockwise by spring 474. Pusher arm 465 includes a leading portion 475 having a lip 476 which receives blades 30 and a wing 38 of spring 36 beneath it for guiding them into the open end 19 of magazine 18.

In operation, upon movement of nest 100 to a position aligned with assembly 420, pusher arm 465 and vertical arm 440 are moved, respectively, to the left and down, rollers 154, 156 removing fingers 123, 124 from the path of spring depressor 159, which in turn depresses spring 36 until horizontal pusher arm 465 has inserted the blades and springs into the open end 19 of magazine 18, the magazine being held in place by holder 158. The downward displacement of lower wall 138 of chamber 106 from lower wall 128 of chamber 108, and the inward displacement of the vertical wall 110 of chamber 108 from adjacent vertical wall 112 of chamber 106 serve to guide blades and spring into the interior of magazine 18 (see FIGS. 6, 7, 8). Magnetic portion 117 maintains the dull edges 31 of the blades against wall 110 until the blades enter the interior of magazine 18, thereby protecting the sharp edge of the blade from scraping the magazine wall. Magnet 118 is designed to maintain the dull edges of the blades against the wall of the magazine adjacent wall 112 of chamber 106.

In FIGS. 20 to 22, there are shown those portions of end plug loading assembly 490, occupying station 84 in the first assembly area, which differ from spring and blade loading assembly 420, the assemblies being otherwise substantially identical. The structure of assembly 490 differs in that spring depressor 159 has been removed from member 460, and in that pusher 465 has been replaced by pusher 491 which provides a lug 492, mating in slot 53 of end plug 50, and a tapered portion 493 following wing 55 of end plug 50. In addition, there has been added a feed shuttle 494, which reciprocates in feed channel 495 to feed end plugs 50, one at a time, into secondary channel 496. Shuttle 494 is driven by appropriate camming means, such as were employed to control the spring-feeding stroke of pusher arm 333 of the spring feeding assembly (see FIGS. 15, 16). Pusher arm 491 slides in channel 496 which is aligned with longitudinal chamber 108 of nest 100 (FIG. 20). The end plugs are fed to channel 495 in appropriate alignment with the open end 19 of magazine 18. Furthermore, a piston 498 is mounted to the rear of pusher 491, slidingly secured in pressure chamber 500, which is connected to a source of air pressure (not shown), operated by a switching means (also not shown, but which may be conveniently mounted at a blank station in the first assembly area), by pressure line 502. Piston 498 is connected by shaft 503 to block 504, which is secured to the flat rear surface 506 of pusher 491.

In operation, end plugs are fed continuously (e.g., from a vibratory feeder 508 (FIG. 1)) to channel 495 and are fed singly by shuttle 494 into channel 496. The forward motion of pusher 491 drives a single end plug 50 through nest chamber 108 until contact is made between the open end 19 of a magazine 18 and the rectangular portion 52 of the end plug 50. This entire movement is carried out without supplying any air pressure to chamber 500. At the moment of contact, chamber 500 is pressurized, causing piston 498 to move to the left (FIG. 21), applying a sudden force, through block 504 and pusher 491, to end plug 50, thereby securely press fitting plug 50 into magazine 18, as shown in FIGS. 2, 3, and also inserting blade guide 57 against the sharp edge 32 of blades 30, and lug 56 into notch 25. Upon completion of this press fit, the air pressure is removed and pusher arm 491 moved back out of nest 100 into position to operate on the next indexed nest, while allowing the loaded cartridge and its carrier nest to be indexed to the next (unloading) station. The mechanical drive means operating pusher 491 may be conveniently altered from those driving pusher 465 to accommodate the sudden movement of piston 498 and hence of pusher 491. For example, a spring may be connected between the cam and roller operating the arm.

Figure 23:
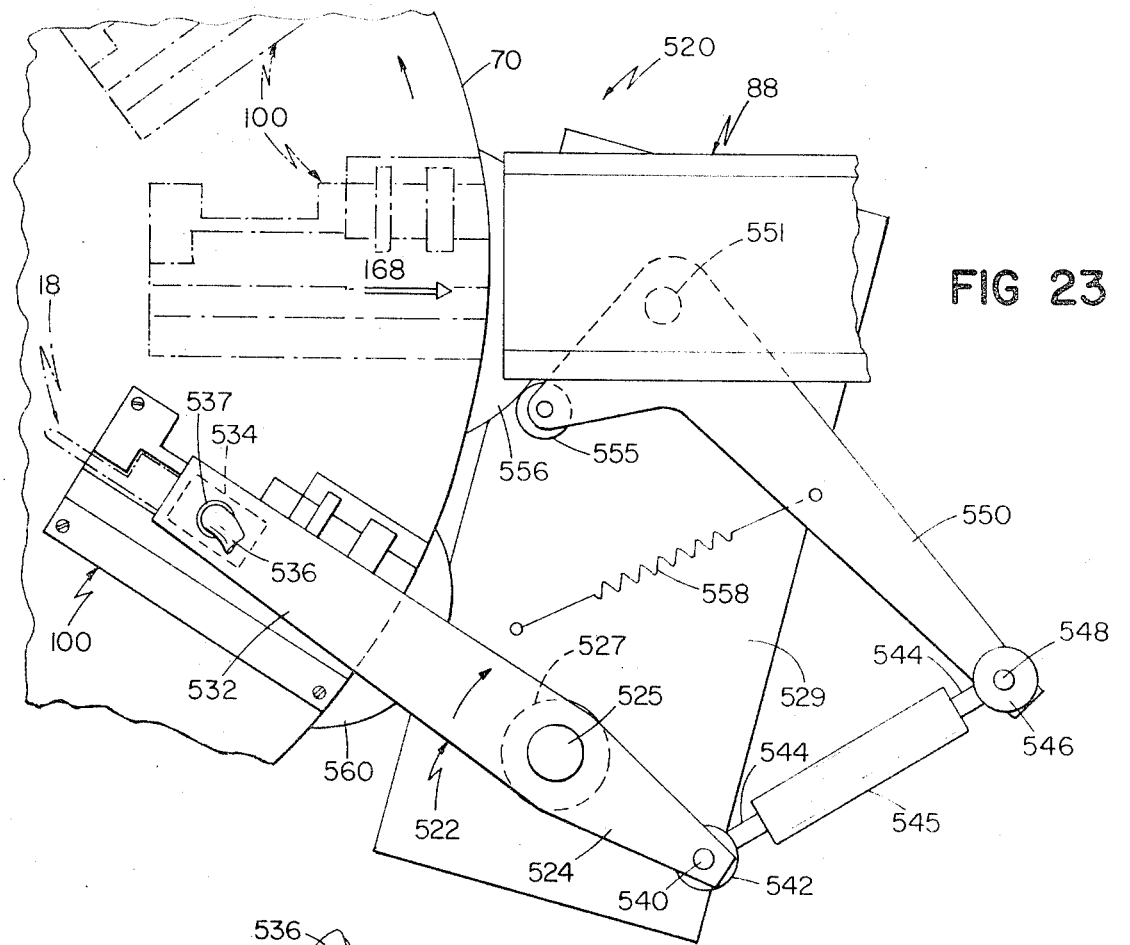
FIG. 23 is a plan view of an embodiment of an apparatus for unloading a partially assembled cartridge.
Figure 24:
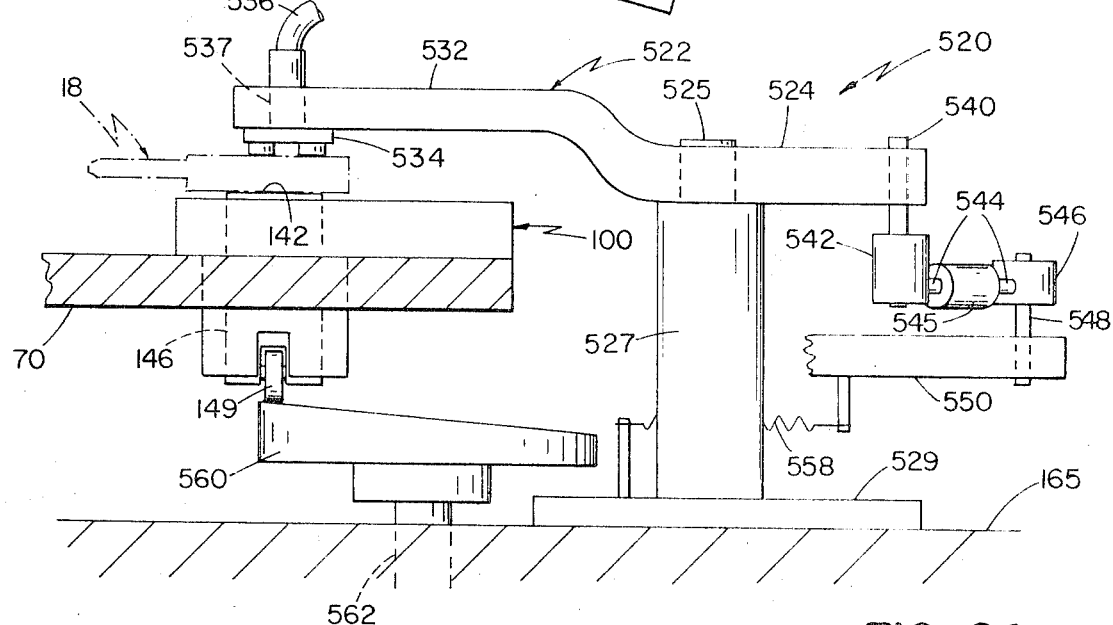
FIG. 24 is a side elevational view, with portions broken away, of the apparatus of FIG. 23.

FIGS. 23 and 24 show the unloading assembly 520, which occupies station 86 at the first assembly area. Unloading assembly 520 includes a lever arm 522, having a support portion 524 pivoted through pin 525 to fixed shaft 527 which is secured to plate 529, which rests on support platform 165, and an operative portion 532, having a vacuum chuck 534 secured thereto, vacuum line 536 extending through an opening 537 in operative portion 532 to a suction source (not shown) operated by switching means (also not shown but which may conveniently be situated at a blank station of the first assembly area). Pivot pin 540 extends between support portion 524 and block 542, which is further connected to a shaft 544 of adjustable length, the adjusting mechanism being contained within sleeve 545. Shaft 544 is also connected to block 546, which is rotatably connected to pivot pin 548, which is also rotatably secured to drive arm 550. Drive arm 550 is pivoted at pin 551, which extends from plate 529 to the underside of conveyor 88, providing support therefor. Arm 550 is driven about pin 551 by cam roller 555, which follows cam 556, of which only a portion is shown. Spring 558, secured also to plate 529, maintains roller 555 against cam 556. A second cam 560 is rotatably driven, by appropriate means not shown, by shaft 562, and contacts roller 149 on nest 100, thereby raising and lowering slide 146 and elevator platform 142. A detector (not shown) is mounted within vacuum chuck 534 for detecting the presence of a magazine on said chuck while the lever arm is moving from the nest to the conveyor, and the absence of a magazine during return movement of the chuck. This detector is set to operate by appropriate switching means, only while suction is ON, and determines the presence or absence of a magazine by determining the presence or absence of moving air within said chuck.

In operation, rotation of cam 560 raises elevator 142, and hence raises magazine 18 into contact with vacuum chuck 534, which has suction applied thereto. Rotation of cam 556 then causes pivotal movement of arm 550 about pin 551, thereby pivoting lever arm 522 about pin 525 in the direction of the arrow in FIG. 23. Thus magazine 18 is transferred to a position vertically aligned with conveyor 88, whereupon suction to chuck 534 is shut off, allowing magazine 18 to drop onto and be carried away by the conveyor. During this movement of arm 522, further rotation of cam 560 returns roller 149 to its lower position. After movement of arm 522 toward conveyor 88 has begun, disc 70 may be indexed, so that at the completion of the return movement of arm 522, with suction back on, another nest will be in position to have the magazine similarly removed therefrom.

The timing of the operations of the first assembly area is shown in FIG. 37. As indicated at the top scale, each curve represents a 360° rotation of the pertinent cam, or one complete operation of every station. Curve I indicates the indexing of a nest, the nest moving as the cam rotates between point $b$ (288°), through 360°, to point $a$ (72°), and being stopped during rotation of the cam between point $a$ (72°) and point $b$ (288°), leaving only 216° during which operations may be performed on the nest, or, where it is desired to assemble at least 60, and preferably at least 80 cartridges per minute, no more than about 0.6 second.

Curves IIA and IIB indicate the operation of the magazine loading assembly 170, IIA showing the horizontal movement of pusher arm 180 from the starting position (point $b$ [270°]) through 360° to its final position (point $a$ [90°]), and the return movement, between point $a$ and point $b$ to a starting position ready to feed another magazine. Curve IIB indicates the stroke of vertically moving pusher block 210, which is in its starting position at point $a$ (90°), pusher 180 (IIA) having fed a magazine to pusher block 210, completes downward movement at point $b$ (180°), depositing a magazine into the nest, and has returned to its starting position at point $c$ (270°), in time to clear nest 100 which will be moved just 18° later (Curve I, point $b$).

Curves IIIA and IIIB pertain to blade loading assembly 230, curve IIIA indicating the horizontal movement of pusher arm 250, and curve IIIB indicating the activation of blade detector assembly 278 during that portion of the stroke of pusher arm 250 corresponding to the movement of blades 30 through gate 254. According to curve IIIA, pusher arm 250 is at its starting position at point $a$ (72°) and completes its stroke, depositing blades into the nest at point $d$ (252°). At point $b$ (139°) on curve IIIA, corresponding to point $a$ on curve IIIB, blades begin advancing past gate 254, wheel 279 of detector assembly 278 already having started to drop; wheel 279 contacts blades 30 between points $b$ (139°) and $c$ (147°) of curve IIIB (for a total of about 8°) and returns to its raised position at point $d$, corresponding to point $c$ on curve IIIA (164°).

Curves IVA and IVB pertain to the feeding of a spring into the nest by spring feeding assembly 330. Curve IVA shows the forward stroke of pusher 333 between point $c$ (338°) and point $a$ (18°), delivering the spring to pusher 354, and return of pusher 333 between point $a$ (18°) and point $b$ (58°); curve IVB indicates that pusher 354 begins its stroke at point $a$ (18°), corresponding to delivery of a spring by pusher 333, completes its stroke at point $b$ (198°), depositing a spring in the nest, and returns until point $a$ is again reached.

Curve V is relevant to the blade feeding, spring feeding, blade and spring loading, and end plug loading assemblies, in that it indicates the vertical movement of device 152 operating on the nest fingers (rollers 154, 156), on the magazine (magazine holder 158), and on the spring 36 (depressor 159), all of which will be operated by identically shaped cams. According to curve V, these vertically operating members move downward between point a (62°) and point b (102°) at which full contact is achieved, remain in the downward position until point c (258°), and are released by upward movement of the vertical members, completed at point d (298°). Curve IVA also shows the movement of shuttle 494, feeding an end plug into secondary channel 496 between points c (338°) and a (18°), leaving it in position for further feeding by pusher 491 (shown at curve VI), and returning between points a (18°) and b (58°) into position to shuttle another end plug after indexing of the nest.

Curve VI shows the movement of pusher arm 465 at the blade and spring-loading assembly 420, and of pusher arm 491 at the end plug loading assembly 490. The forward stroke is from point a (102°), to point b (195°), at which point the spring and blades, or the end plug is inserted into the magazine, and the return stroke is from point b to point c (288°).

Finally, curve VII indicates the transverse movement of lever arm 522 of the unloading assembly 520, this lever arm carrying a magazine from the nest at point a (90°), depositing the magazine onto conveyor 88 at point b (210°), and returning to its original position at point c (270°). The operation of vacuum line 536 is not indicated, but may be run by a suitable switch. The period during which the vacuum would be shut off would not commence until very near point b (about 207°). Elevator 146 is also operated by appropriate camming means which raise the elevator up through slot 145, raising the magazine into engagement with the vacuum chuck 534 on lever arm 522 prior to point a on curve VII, and return out of engagement with roller 149 prior to point b (288°) on curve I (i.e. prior to indexing of the now empty nest to the next station).

Referring again to FIG. 1, the partially assembled cartridge is carried from first assembly area 12 by conveyor 88 to station 94 of the second assembly area 14, where it is reloaded into a nest 600 (FIG. 25), secured to a nest position 92, and carried past stations 95, 96, where the pusher and UBC are loaded, back to unloading station 97, and from there onto conveyor 98.

This second assembly area comprises a chain 90 which has secured thereto a number of equally spaced adjacent nests 600; and indexing means 602, for moving belt 90 past the various stations, and stopping each nest 600 adjacent each station for a predetermined time sufficient to complete the operations at that station.

Referring to FIGS. 25 and 26, each nest 600 comprises a base 605, an adjusting block 606, fixed guide 608, 609, including, respectively, overhanging portions 610, 611, secured to base 605, and overhanging block 606, and a magazine supporting block 612, secured to adjusting block 606, and providing a chamber 613. Springs 614 normally urge adjusting block 606 against guide block 608, block 606 being free to slide on base 605 under the overhanging portions 610, 611 of guide blocks 608, 609. An opening 615 beneath base 605 permits access to the underside of base 605.

Magazine supporting block 612 includes a vertical wall 617, having a spring-loaded detent 619, urged inwardly by leaf spring 620, an opposite vertical wall 621, and a relatively thin end wall 622. Lower wall 624 includes a first bore 625, which also extends through adjusting block 606 into opening 615 of base 605, and a second bore or slot 627, in which is retained recessed pin 629, secured to adjusting block 606, and residing in notch 630 of base 605, permitting rotational and lateral movement of block 606 on base 605, but not longitudinal movement (perpendicular to the direction of the chain). Base wall 624 is raised slightly above the adjacent horizontal surface or runway 632 of adjusting block 606. Block 612 is positioned on runway 632 by means of upstanding lips 634 of adjusting block 606.

Nest links 640 are secured to base 605, and are linked, through appropriate pins 643, to links 644 of a single-pitch chain 90. Each link 640 actually is merely a chain link, like 644, whic has an extended flange bent outward at a right angle to form a portion 645 secured to the underside of base 605 of nest 100 (see FIG. 27). Opening 615, previously mentioned, is thus bordered by two pins 643 and two parallel adjacent nest links 640. The positioning of each block 606 is controlled by an adjusting lever 646, located at each station, and actuated upon stopping of a nest at each station by drive arm 647, to pivot a predetermined amount about pin 648, secured to supporting structure 650 which is supported on base 651. The motion of this adjusting lever 646 causes abutting portion 652 to engage surface 654 of adjusting block 606, thereby aligning block 606, and hence chamber 613, with respect to the corresponding station, for proper carrying out of the assembly operations. Advantageously, drive arm 647 supports all these adjusting levers (one for each station) so that they may be simultaneously operated from a single drive means.

Referring now to FIGS. 1 and 27, the indexing means 602 for driving chain 90 is somewhat schematically shown. At least one sprocket wheel 657 is secured on shaft 658 by a suitable spline, to allow some axial movement of the shaft within sprocket wheel 657. Sprocket wheel teeth 659 are driven between pins 643 by rotation of shaft 658, thereby driving each nest back under stations 94, 95, 96, the assembled cartridge being held therein by detent 619.

The rotation of shaft 658 is operated by drive arm 665 through clutch 667. Rod 669 drives drive arm 665 in a clockwise direction, while arm 665 is engaged to shaft 658 by clutch 667. Rod 669 is in turn pivotally connected to arm 665 by pin 670, and connected at its other end to, e.g., a cam roller for driving it periodically in a vertical stroke. Engagement of clutch 667 allows shaft 658 to follow the rotation of arm 665, shaft 658 being rotated sufficiently to move a nest between two adjacent stations. In the embodiment shown in FIG. 27, clutch 667, which is secured to drive arm 665, includes a slot into which pin 672, secured to shaft 658, is inserted upon inward movement of clutch drive bar 674, secured to shaft 658. Shaft 658 is thus moved axially, with inward movement of clutch bar 674, and within the limits of the spline between shaft 658 and sprocket wheel 657, to engage pin 672 with a slot in clutch 667, thus engaging sprocket wheel 657 for rotational movement with drive arm 665. Outward movement of drive bar 674 similarly disengages sprocket wheel 657 and drive arm 665, so that they may move freely of one another. Clutch drive rod 674 is rigidly secured to rod 676, for rotation therewith. Rod 676 is rotated by rigidly secured crank arm 678, driven by vertically reciprocating arm 680, pivotally connected through pin 682, arm 680 being driven by, e.g., a cam roller (not shown).

The operation of the indexing mechanism is shown on curves IA and IB of FIG. 38. The clockwise stroke of arm 665 (downward stroke of arm 669) is indicated at curve IB between points d (315°) and a (90°) during which time clutch 667 is engaged (drive bar 674 is in) according to curve IA, engagement beginning at point c (255°) and being completed at point d (315°). Curve IA thus depicts an upward stroke of rod 680 between points c and d. Between points d and a (Curve IB), since clutch 667 remains engaged, sprocket wheel 657 is rotated indexing each nest to its next position. At point a of curve IA, clutch 667 disengages to point b (135°) (downward stroke of rod 680), while no movement of arm 665 occurs, at curve IIB, between similar points a and b. Finally, in accordance with curve IB, arm 665 rotates in a counterclockwise direction, corresponding to an upward vertical stroke of arm 669, while curve IIA indicates that clutch 667 remains disengaged, between points *b* (90°) and *c* (225°). Hence shaft 658 and attached sprocket wheel 657 are unaffected by the counterclockwise rotation, or recocking, of arm 665. The total elapsed time during which the nest is stopped at any station, then, is from 90° to 315°, or where 60 to 80 cartridges per minute are being produced, at most about a little over 0.6 second. The remaining timing curves of FIG. 38 will be treated together.

Referring now to loading station 94, at which a partially assembled cartridge is loaded into nest 600, FIGS. 28 and 29 depict (along with FIG. 1) loading mechanism 700 located at this station. Mechanism 700 is secured on base 651, nest guides 702 (see FIG. 1) being secured to supporting structure 650 mounted on base 651 for generally maintaining nests 600 and chain 90 aligned and flat. Chain 90 and its associated indexing means have been eliminated, for clarity, in FIGS. 30 to 32. Secured to supporting structure 651 are supporting blocks 705, 706, between which are fixedly secured guide rods 707, 708. Block 710 includes two bores, not shown, for slidingly engaging rods 707, 708, permitting horizontal movement of block 710 thereupon. Block 710 is driven, through pin 711 and coupling 712, by arm 713, which is connected to lever 715 by coupling 717 and pin 718. Lever 715 is pivoted to supporting structure 651 by pin 721, and to vertically reciprocating drive rod 723 by coupling 725 and pin 726. Rod 723 is secured at its other end to drive lever 727 by coupling 728 and pin 729, lever 727 being pivoted, by pin 730, to fixed structure 651, and being rotated with respect to structure 651 by cam roller 734, secured at the end of drive lever 727 by pin 736 and following a rotating cam indicated schematically at 738, and driven by suitable means (not shown).

Pivotally mounted in a recess of block 710 is loading device 740, including depending flange 742 and a rounded portion 744 opposite pivot pin 747. Compression spring 748 normally urges device 740 in a clockwise direction around pin 747.

Magazines are fed from conveyor 88 onto a loading platform 750, including an upright wall 752 against which the lead magazine comes to rest, aligned with device 740 and with chamber 613 of nest 600; a second guide wall 753 also aids alignment. Conveyor 88 communicates with platform 750 and includes an indexing drive, indicated generally at 755, which indexes conveyor 88 for a distance slightly greater than the width of a magazine, in order to stack the magazines in a contiguous line on the conveyor and on platform 750, against stop 752.

In operation, flange 742 of member 740 engages magazine 18, on platform 750, at surface 27 while conveyor 88 is stopped, and slides it along platform 750 (which is slightly raised above surface 632 of nest 600) into chamber 613, and against the rear wall thereof. The pressure against flange 742 by slight overtravel of block 710 beyond that necessary to insert magazine 18 into chamber 613 causes slight rotation of member 740 about pin 747, driving rounded portion 744 down against magazine 18 to secure it in chamber 613 against lower wall 624. Member 740 is then retracted by block 710, until flange 742 is driven past the next magazine, at which time conveyor 88 is indexed to move that magazine into position at wall 752. Contacts 765, 766 will indicate whether a stroke has been completed for inserting a magazine into the nest.

In FIGS. 30 and 31 (and in FIG. 1) is shown the pusher loading assembly 770 located at station 95 of the second assembly area. Assembly 770 includes chute 772, connected to a vibrating feeder bowl 774, which feeds the pushers 40, with their handles 44 facing upward, onto loading platform 776, secured to supporting block 778, which is in turn fixed to supporting structure 651. Guide rail 780 fits between the handles 44 of each pusher 40 and aligns the pushers on platform 776.

Supporting blocks 778, 781 have secured therebetween two guide rods 783, 784 which extend slidingly, respectively, through two bores (not shown) in block 786, allowing block 786 and its associated structure to slide along rods 783, 784.

Three drive means (e.g., cams with associated rollers, eccentrics, etc.) none of which are shown, are required to operate assembly 770.

The first drive means drives rod 790 vertically. Rod 790 is pivoted, by pin 791 and coupling 792, to lever 795, which is pivoted to fixed structure 651 by pin 797, and to drive rod 800 by coupling 801 and pin 802, which rides in slot 803. Drive rod 800 is secured, through coupling 804, to pin 806, which is secured to block 786.

Vertical member 808 extends through a bore 810 in block 786 and moves horizontally with block 786; member 808 terminates in a U-shaped element 812, shaped to engage the major planar surface of handle 44 of pusher 40, between the two wings 45, and with sufficient clearance under the U to also accommodate magazine 18. Member 808 is retained in bore 810 by pin 813, which is held between the ends of two rockers 815, 816. Support 817 pivotally secures rocker 815 to block 786 (about a pivot not shown), rocker 815 normally assuming one of two orientations, depending on the vertical position of member 808. Member 808 is normally held in the position shown in FIG. 30 by spring urged stop 818, secured within block 786, and fitting into recess 819 in member 808.

The second drive means (not shown, and also, e.g., a cam or eccentric structure) drives rod 820 vertically, thus pivotally operating rocker 816, to which it is pivotally secured by coupling 822 and pin 823, about pin 824, secured to guide block 778. Rocker 816 is also secured, through projection 826, coupling 827, and pin 828 to drive arm 830. The other end of drive arm 830 is pivotally connected, through coupling 832 and pin 833 to rocker 835, which pivots about pin 836 secured to supporting block 781.

The third drive means (also not shown, and of structure, e.g., similar to the other drive means) vertically operates rod 838, which is pivotally secured, by coupling 840 and pin 841, to lever 844, pivoted to block 781 by pin 846, and carrying a blade raising rod 847, which is aligned for movement through opening 625 of nest 600 (not shown in FIGS. 30, 31). Also pivotally secured to lever 844 by pin 848 is bar 849, including an elongated slot 850, receiving pin 851 which is secured to steadier arm 852. Arm 852 is pivotally secured to guide block 781 at pin 854, and is urged in a clockwise direction about pin 854 by spring 855, which is secured to block 781. Lever arm 852 includes a leading portion 857, for engaging the upward face of magazine 18 and thus securing the magazine in nest 600 during insertion of pusher 40.

Platform 776 includes a slot 859, for receiving stop 860 which is urged by leaf spring 861 (secured to the underside of platform 776) through slot 859, the leaf spring being sized to maintain stop 860 in position against an advancing line of pushers, and to allow stop 860 to be deflected into slot 859 upon horizontal movement of a pusher by U-shaped member 812.

Block 786 also has a detecting element 865 secured adjacent its leading edge, a second detecting element 866 being located on block 781 to make contact with element 865 if the stroke of block 786 and associated structure is completed, thus indicating assembly of the pusher and magazine.

In operation, the upward stroke of arm 820 drives rocker 816 in a counterclockwise direction about pin 824, thereby driving pin 813, and attached vertical member 808 down to engage U-shaped element 812 with a pusher 40, and thereby also rotating rocker 815 in a clockwise direction to its second stable position, and driving rod 830 to the left, which causes counterclockwise rotation of rocker 835 about pin 836. As soon as U-shaped element 812 has engaged a pusher, upward movement of arm 790 drives arm 800, and hence block 786 and associated structure toward magazine 18. Before the pusher reaches magazine 18, however, downward movement of rod 838 pivots lever 844 about pin 846 to drive rod 847 through opening 625 of nest 600 and slot 20 of magazine 18 to at least slightly raise blades 30 off the inside of dispensing wall 21 of magazine 18, allowing the blade indexing portions 41, 42 of pusher 40 to slide under the blades. Movement of rod 838 also drives bar 849 along steadier arm 852, and slot 850 along pin 851, allowing spring 855 to pivot arm 852 about pin 854, and thus to engage leading portion 857 with magazine 18, holding the magazine in place for insertion of the pusher thereinto. The pusher slides along surface 632 of nest 600 and into contact with the portion of magazine 18 which overhangs wall 624 of chamber 613 (i.e., the portion to the right of rod 847, in FIG. 31). The pusher need be inserted into magazine 18 only far enough so that indexing portion 41 will be at least partially beneath the blades when rod 847 is withdrawn; the force of spring 36 will then be sufficient to maintain pusher 40 in place in magazine 18. If the desired insertion is not completed, detectors 865, 866 will not make, and a signal will be given indicating an imperfect assembly. At completion of the stroke, rocker 815 will be engaged by the underside of rocker 835, and thereby rotated in a counterclockwise direction, raising pin 813 and hence rod 808, taking U-shaped member 812 out of contact with pusher 40 for the return stroke of block 786 to its original position (FIG. 30), and readying member 812 for picking up another pusher for the magazine in the next-indexed nest. Withdrawal of rods 830, 800, and upward movement of rod 838 allow all the moving parts to return to the positions indicated in FIG. 30.

Referring to FIGS. 32–36 there is shown a UBC loading assembly 870, which occupies station 96 of the second assembly area. Assembly 870 includes (see also FIG. 1) supporting blocks 872, 873, secured to fixed support 651, the blocks having secured therebetween guide rods 875, 876, upon which slides, on appropriate bores, block 880. Disposed beneath block 880 is a lower block 882, which includes a first inner bore 883, and a reduced diameter second inner bore 884, in which vertically reciprocating vacuum chuck 886 and attached hollow drive rod 887 are guided, a vacuum line 889 being secured to and communicating with the interior of rod 887, and rod 887 being vertically driven by appropriate drive means (e.g., a rotating cam and associated structure, or an eccentric) not shown. Secured to the top of block 882 are guides 890, which position a UBC received from sloped chute 892, which delivers properly oriented UBC's from vibrating feeder bowl 893 to platform 894, the top surface of block 882.

Block 880 is driven along guide rods 875, 876, by drive rod 898 connected thereto through pin 896 and coupling 897. Drive arm 898 is pivotally secured by pin 899 and coupling 900 to lever arm 902 which is in turn pivotally driven about pin 904 (secured to fixed structure 651) by rod 906, which is secured to lever arm 902 by pin 907 and coupling 908, and is driven in a reciprocating vertical stroke by appropriate means (not shown). Block 880 includes a pair of downwardly extending spaced armatures 910, between which is pivotally secured, on pin 912, UBC carrier 914, including opposed guide walls 915, the forward one of which has extending guide strips 916 and projecting lug 917, a perpendicular narrow thin guide spring 918, and a rear stop plate 919. Vacuum chuck 920 is secured between guide walls 915 and is connected to suction means (not shown) by vacuum line 921. The chuck is both canted (toward rear guide wall 915) and tilted (parallel with chuck 886) to similarly cant and tilt a UBC secured therein. Carrier 914 is urged in a clockwise direction about pin 912 by spring 924, secured to lug 925 on block 880, and is maintained generally horizontal when block 880 is in the position of FIG. 32 by set screw 926, threaded through supporting block 872. Set screw 926 therefore maintains the surfaces of vacuum chucks 920 and 886 substantially parallel when the assembly is at the FIG. 32 position.

Pivotally secured to supporting block 873 by pin 930 is guide arm 932, which includes a guide slot 933, sized to receive lug 917 of carrier 914. Guide arm 932 is pivoted about pin 930 by drive rod 935, pivotally connected to arm 932 by pin 937 and coupling 938; drive rod 935 is driven in a vertically reciprocating direction by appropriate drive means (not shown). Also pivotally secured to supporting block 873 is clamp arm 940, pivoted about pin 942, and urged in a clockwise direction by spring 944, connected to projection 946 on supporting block 873, and in a counterclockwise direction by set screw 947, threaded through guide arm 932. Clamp arm 940 includes a leading portion 950 shaped to engage the lower edge of opening 64 in UBC 60 (FIG. 36).

In operation, the upward stroke of rod 887 drives vacuum chuck 886 into the open interior of UBC 60 and lifts it into engagement with vacuum chuck 920, in carrier 914, whereupon the suction through line 887 (chuck 886) is discontinued, and rod 887 is retracted. The upward stroke of rod 906 then drives block 880 to the left (FIG. 32), breaking contact between screw 926 and carrier 914, allowing the carrier to pivot around pin 912, under force of spring 924, into an orientation such as that shown in FIG. 35. The cant and tilt of vacuum chuck 920 causes UBC 60 to be both canted (as shown in FIG. 33) and tilted (as shown in FIG. 35), with respect to magazine 18. Block 880 is then driven along guide rods 875, 876 until lug 61 of UBC 60 is just short of entering recess 26 of magazine 18 (FIG. 33), pin 917 meanwhile riding partially into notch 933 of guide arm 932. The stroke of arm 906, and hence the movement of block 880 is then momentarily stopped, while rod 935 begins its upward stroke, pivoting guide arm 932 and clamp 940 from the position shown in FIG. 35 about one-half way to the position shown in FIG. 36, thus reducing the cant of the UBC with respect to the magazine, and also, by reason of the sliding of the walls of the UBC along the vertical walls of the magazine, eliminating most of the orientation shown in FIG. 33. This downward movement serves to align lug 61 parallel with recess 26; the suction in chuck 920 is shut off just prior to this downward movement, in order that the UBC may become free of the orientating influence (like FIG. 33) of this chuck. The movement of block 880 is then begun again, and the downward pivoting of arms 932, 940 continued until lug 62 of the UBC engages the upper edge of rectangular bore 53 of end plug 50; guides 66 of UBC 60 come to rest against surface 22 of magazine 18, trapping wing 55 of end plug 50 between them and opening 64 (FIG. 34), leaving arm 932 as shown in FIG. 36.

Rod 935 is then driven downwardly, raising carrier 914, through pin 917, off UBC 60; rod 906 is then driven downwardly, causing block 880 to retreat back to the position shown in FIG. 32 in time to receive a new UBC from chuck 886, screw 926 serving to reorient carrier 914 by counterclockwise rotation about pin 912.

Completely assembled magazines then pass around beneath stations 94–96 (cf. FIGS. 1 and 27) and are unloaded from the nests at station 97. Referring to FIG. 1, vacuum chuck 963 (communicating with suction means, not shown) is fixed onto lever arm 965 which rotates with pin 966, fixed thereto, pin 966 being in turn rotated by rod 968, and pivotally connected to fixed structure 651. Rod 968 is pivotally connected to a reciprocating drive arm 969, conveniently driven by an eccentrically mounted pin on a rotating disc (such as, e.g., disc 350 and pin 367 of FIG. 15).

Arm 963 is thereby driven, with pin 966, from adjacent a nest at position 970 (FIG. 1), where chuck 963 picks up an assembled cartridge by engaging the top of the UBC portion, to a position adjacent conveyor 98, at which point suction to chuck 963 is discontinued, allowing the assembled cartridge to drop onto conveyor 98, from whence it is carried away in the direction of the arrow.

The timing of the operations at stations 94–97, along with the previously described indexing system 602, is shown at FIG. 38. Curves IA and IB, as previously discussed, pertain, respectively, to the operation of clutch 667 and the clockwise stroke of arm 665 (movement of a nest between stations). Curve IC indicates the engagement of the portion 652 of each adjusting lever 646 with the surface 654 of the nest, aligning the nest at the station at which the particular lever 646 is located. Lever 646 rotates into engagement between points $a$ (65°) and $b$ (120°), remains engaged until point $c$ (285°), and is disengaged by point $d$ (306°), remaining disengaged until a point $a$ is reached again. While lever 646 is disengaged, according to curve IB (disengage point $d$ at curve IC occurring 9° prior to point $d$ of curve IB, at which point indexing movement commences), a nest is indexed, lever 646 engaging the nest just as indexing is completed (comparing point $a$ of curve IB with point $b$ of curve IC).

Curves IIA and IIB represent, respectively, indexing movement of magazine conveyor 88, and horizontal movement of loading device 740. As indicated on curve IIA, conveyor 99 is indexed forward only between points $a$ (0°) and $b$ (65°), the width of a magazine, and an additional slight distance between $b$ (65°) and $c$ (90°) to keep the partially assembled cartridges tightly packed along conveyor 88. The cam controlling movement of conveyor 88 returns between points $d$ (285°) and $e$ (310°), without moving the conveyor. According to curve IIB, loading device 740 transfers a partially assembled cartridge from platform 750 into nest 600 between points $a$ (90°) and $b$ (252°), remains in position at the nest until point $c$ (270°), and then quickly returns to point $d$ (360°), ready to engage another partially assembled cartridge, indexed into position (curve IIA, points $a$ to $b$) before device 740 is ready to move again (curve IIB, point $a$).

Curves IIIA, IIIB, and IIIC illustrate the assembly of the pusher, referring, respectively, to lifting of the blades in magazine 18 by movement of rod 847 (downward motion of rod 838), to engagement of the pusher by U-shaped element 812 (vertical motion of rod 820), and to transfer of the pusher into magazine 18 by sliding movement of block 786 (vertical movement of arm 790). Thus, between points $a$ (0°) and $b$ (72°) at curve IIIB, U-shaped element 812 engages a pusher. At points $a$ (105°) of curve IIIA, rod 847 begins to move toward blades 30, and completes lifting them away from magazine 18 by point $b$ (195°) of curve IIIB. Meanwhile, at point $a$ (108°) of curve IIIC, block 786 has begun to move toward nest 600, carrying a pusher with it. While rod 847 maintains the blades in uplifted position (between point $b$ (195°) and point $c$ (225°) of curve IIIA), the pusher is inserted partially into magazine 18, under blades 30. Rod 847 then begins to retract (point $c$ (225°) of courve IIIA) while the pusher is transferred into magazine 18 (point $b$ (250°) of curve IIIC). Block 786 remains at its final position (between points $b$ (250°) and $c$ (288°) on curve IIIC) while U-shaped element 812 is lifted out of engagement with the pusher (between points $c$ (250°) on curve IIIB and 288°); block 786 begins to return (point $c$ (288°) on curve IIIC) while upward return of U-shaped element 812 is being completed (to point $d$ (300°) on curve IIIB), and is completely returned by point $d$ (360°) on curve IIIC, ready to engage another pusher.

Curves IVA, IVB, IVC indicate the assembly of the UBC. In particular, curve IVA shows the movement of vacuum chuck 886 (vertical stroke of rod 887) lifting a UBC at point $a$ (0°) into engagement with vacuum chuck 920 at point $b$ (90°), and returning to its lower position at point $c$ (135°), in position to engage another UBC.

Curves IVB and IVC indicate, respectively, the movement of block 880, carrying the UBC on vacuum chuck 920 (vertical stroke of rod 906) and the rotational movement of guide arm 932 (vertical stroke of arm 935). According to curve IVB, block 880 moves from its starting position at point $b$ (108°) to point $c$ (211°), almost all the way to its final position, and stops at that position until point $d$ (234°). Meanwhile, referring to curve IVC, guide arm 932 has rotated slightly, thereby slightly changing the longitudinal angle between the UBC and the magazine, orienting lug 61 with recess 26 (midway between the positions shown in FIGS. 35 and 36). Block 880 is then moved to its final position (point $e$ (250°) on curve IVB), and remains there until rotational movement of guide arm 932 is completed (point $c$ (265°) on curve IVC), and guide arm 932 has fully returned to its raised position (point $d$ (293°) on curve IVC) raising vacuum chuck 920, now not under suction, away from the UBC. Block 880 then returns (point $f$ (288°) to point $a$ (36°) on scurve IVA) to its starting position, aligned to receive another UBC, remaining there until after (point $b$ (108°)) it has so received another UBC from vacuum chuck 886 (curve IVA, point $b$ (90°)).

Curve V indicates the unloading station 97, the movement of lever arm 965 from over the conveyor (point $a$ (0°)), to the nest (point $b$ (180°)) where it picks up an assembled cartridge, and back to point $a$, where the cartridge is deposited on the conveyor and carried away. Curve V is conveniently provided by an eccentric pin secured on a rotating member.

The cooperating speeds between the first assembly area and the second assembly area may be controlled by means of two pairs of sensors 980, 982, located along conveyor 88, each sensor pair including a sensor on either side of conveyor 88 to sense the presence or absence of a partially assembled cartridge therebetween. Chain 90 of the second assembly area is set to operate at approximately the same speed as disc 70 of the first assembly area, and no change will be made in either speed so long as there is a magazine between sensors 982, i.e., these sensors are ON (indicating that there is a line of magazines at least between these and station 94) and no magazine constantly between sensors 980, except for one passing by to reach the end of the line, i.e., sensors 980 are periodically OFF (indicating the end of the magazine line to be somewhere between sensors 980 and sensors 982). If sensors 982 go OFF, then either chain 90 must be slowed down or stopped or disc 70 must be speeded up, until the supply of magazines again extends past sensors 982. If sensors 980 remain ON for any predetermined period of time, then belt 90 must be speeded up or disc 70 slowed or stopped until the end of the line of magazines again lies between sensors 980, 982.

Although only several stroke detectors have been indicated (e.g., at the pusher loading assembly 770), it will be understood that similar sensors may be secured to each assembly as desired. At the spring loading assembly 330, no stroke detector is necessary, since detector 400 is capable of indicating both that a spring has been fed to the pusher, and that it has been correctly loaded into the nest. On the other hand, detector 278 at blade loading assembly 230 is incapable of determining whether blades are actually fully inserted into the rest. Thus, a stroke detector must be provided at that station. Typically, two sensors are employed, one to determine if the stroke has gone too far (i.e., whether a component has been fed) and one to determine if the stroke has gone far enough (whether a component has been completely inserted). These detectors may either feed information to a memory system designed to reject imperfect cartridges at some later point in the assembly procedure, or may operate to shut off the machine at a predetermined position of each station, chosen for maximum repair accessibility.

Other embodiments will occur to those skilled in the art and are within the following claims:

What is claimed is:

1. Apparatus for assembling a cartridge including a magazine open at one end and components therefor including a plurality of elements to be dispensed from said magazine, a spring for maintaining said elements against the dispensing wall of said magazine, and an end plug sealing the open end of said magazine, said apparatus comprising, a nest for securing said magazine during assembly of said components, said nest having a first chamber for securing said magazine, and a second adjacent chamber for receiving said magazine components for insertion into said magazine, a magazine feeding assembly for depositing a magazine into said first chamber, said open end of said magazine communicating with said second chamber, at least one element feeding assembly for feeding said elements to said second chamber, a spring feeding assembly for feeding a single spring into said second chamber on top of said elements, a first loading assembly for inserting said elements and said spring into said magazine through its said open end, an end plug feeding assembly including a second loading assembly for inserting an end plug into said open end of said magazine, and indexing means for advancing said nest and stopping each said nest in alignment with each said assembly.

2. The apparatus of claim 1 including a series of said nests circumferentially arranged about and secured to a rotatable platform, and equally spaced from one another, said assemblies being circumferentially arranged on stationary structure adjacent the periphery of said rotatable platform, and spaced to locate each assembly simultaneously in radial alignment with a nest, and wherein said indexing means operates to advance all said nests simultaneously, and to stop all said nests simultaneously, operating all said assemblies while said nests are stopped.

3. The apparatus of claim 1 wherein said first nest includes spring means for securing said magazine in said first chamber and said magazine loading assembly feeds said magazine into said first chamber with the element receiving wall of said magazine at the bottom of said chamber, and wherein said magazine loading assembly comprises a chute for feeding a magazine to a retaining platform positioned above said nest, said magazine being longitudinally aligned with the said first chamber of said nest and laterally displaced therefrom, loading structure adjacent said retaining platform, including a loading chamber vertically aligned with said first nest chamber and communicating therewith, said loading chamber defined by a stationary vertical wall and an opposed vertical wall spring-urged toward said stationary wall to support a magazine in said chamber, a first pusher arm, structure for driving said first pusher arm horizontally along said retaining platform to push the said magazine from said retaining platform horizontally into said loading chamber, and thereafter driving said arm horizontally in a reverse direction into position for pushing another magazine fed to said retaining platform, a second pusher arm, and structure for driving said second pusher arm vertically through said loading chamber to push said magazine downwardly through said loading chamber, sliding between said stationary wall and said flexible wall into engagement with said spring means in said first nest chamber.

4. The apparatus of claim 3 wherein said chute comprises a longitudinal vertical chamber for delivering a vertical stack of said magazines and said first pusher arm includes a leading portion sized to contact only the lowermost magazine, and a trailing portion sized to support thereupon the remainder of said stack during both the forward stroke of said arm and that portion of the rearward stroke of said arm preceding withdrawal of said leading portion past said magazine stack.

5. The apparatus of claim 1 wherein said nest includes structure for positioning said elements in said second chamber near said open end of said magazine, and structure for clamping said elements in said chamber.

6. The apparatus of claim 5 wherein said second chamber is aligned with said first chamber for transferring said components directly into said magazine.

7. The apparatus of claim 6 wherein the lower wall of said second nest chamber, supporting said elements and spring, is upwardly vertically displaced from the lower wall of said first nest chamber by an amount at least slightly greater than the thickness of said lower wall of said magazine, whereby said elements and spring may freely slide into said magazine from said second nest chamber.

8. The apparatus of claim 6 wherein said elements to be dispensed are single edge injector-type blades, and wherein each said nest chamber is open at the top, said second nest chamber includes a first vertical wall horizontally aligned with the adjacent first vertical wall of said first chamber, and a second opposite vertical wall inwardly displaced from the second opposite vertical wall of said first chamber by an amount at least equal to the thickness of the wall of said magazine adjacent said second vertical wall of said first chamber, said second vertical wall of said second chamber has a magnetic portion, said first vertical wall of said second chamber includes two notches, said structure for positioning said blades comprises a spring-loaded finger pivoted in the said notch closest to said first chamber, said finger having a portion normally urged to extend into said chamber and toward the floor of said chamber, and a second portion, opposite said pivot, depressible to pivot said inward portion arcuately out of said chamber, said inward portion having an inclined base corresponding to the inclined lateral edge of said blades, and facing away from said magazine, and said structure for clamping said blade comprises a second spring loaded finger pivoted in the other said notch of said vertical wall, and including a clamping portion normally urged to extend into said chamber to engage said blades along the flat top surface thereof, and a second portion, opposite said pivot, depressible to pivot said clamping portion arcuately out of said chamber.

9. The apparatus of claim 8 wherein said blade feeding assembly comprises a chute for delivering said blades aligned in a vertical stack, a horizontal platform supporting said stack, in longitudinal alignment with the said second nest chamber, a blade pusher having a leading portion for contacting said blades near the dull edge thereof and extending above said platform for a distance equal to the total thickness of the predetermined number of stacked blades to be inserted in said nest, a gate aligned with said horizontal platform, and with the said second chamber of said nest, of sufficient width to allow blades to pass therethrough, and of a height sufficient to allow only said predetermined number of blades to pass through, structure for driving said pusher arm in a reciprocating horizontal manner, such that the leading portion thereof is driven from a position adjacent said razor stack, through said stack, through said gate, to a position adjacent the rearward edge of said second nest chamber, whereby said blades are deposited in said chamber, said dull edges being retained against the said second vertical wall of said chamber by said magnetic portion of said wall, and such that the said leading portion is subsequently returned to said position adjacent said blade stack, and structure for depressing the extending portion of said second spring-loaded finger while the forward edge of said blades are advancing into said second nest chamber, until said blades rest against said inclined edge of said first spring-loaded finger.

10. The apparatus of claim 9 wherein said chute comprises a longitudinal vertical channel, slightly larger than the surface area of one of said blades, the surface of said chute normally adjacent the longitudinal dull edges of said blades including a magnetic portion for retaining said dull edges against said surface.

11. The apparatus of claim 9 wherein said horizontal platform includes a channel longitudinally aligned with said blades, and of a width less than the width of said blades to allow said blades to be supported on said platform above said channel, and said blade pusher moves in said channel, said leading portion thereof extending vertically out of said channel.

12. The apparatus of claim 11 wherein said blade pusher includes a trailing portion for supporting the remaining blade stack above said platform until said leading portion has returned to said position adjacent said blade stack.

13. The apparatus of claim 9 wherein the vertical surface of said gate adjacent the dull edge of said blades during travel of said blades through said gate includes a magnetic portion for retaining said blades against said vertical surface during said travel.

14. The apparatus of claim 9 including a first detector, positioned between said gate and said nest, for detecting the number of blades passing through said gate, and a second detector, positioned adjacent said pusher, for detecting whether said leading portion of said pusher has reached a position adjacent said nest.

15. The apparatus of claim 14 wherein said first detector comprises
a vertically movable detecting element,
structure for maintaining said element in a raised position above said gate except when said leading portion is pushing said blades through said gate, and allowing said detecting element to drop freely onto said blades during blade movement, through said gate,
and detecting means associated with said detecting element for measuring the vertical distance travelled by said detecting element from said fixed position to said blades, whereby the total number of blades beneath said detecting element may be counted.

16. The apparatus of claim 8 wherein said spring comprises a sheet-forming spring having a central convex portion a wing portion adjacent each side, said wings adapted to contact said elements, and said convex portion adapted to contact the opposite wall of said magazine, and wherein said spring feeding assembly comprises
a first loading platform,
a second loading platform, laterally displaced from said first platform and aligned with said second nest chamber, said second platform being at least as high as the top surface of said elements in said second nest chamber.
a chute for delivering a spring to said first platform, the convex surface of said spring facing said platform,
a first horizontal pusher including a leading portion sized to fit under the said convex surface of said spring and a trailing portion of increased dimension, sized to engage with the front edge thereof, a portion of the edge of said spring structure for driving said pusher, in a reciprocating horizontal manner, such that the front edge of said trailing portion drives said spring from said first platform to said second platform, and for returning said pusher to its stationary position,
a magnet associated with said second loading platform for retaining said spring on said platform when said first pusher arm withdraws,
a second reciprocating horizontal pusher including a leading portion for contacting said spring along a curved surface thereof,
structure for driving said second pusher at a right angle to the movement of said first pusher, from a position having its said leading portion adjacent said spring to a position having said leading portion adjacent said second nest chamber, whereby said spring is deposited on top of said elements, and aligned with said elements by said magnet at the said second vertical wall of said second nest chamber,
indexing means for sequentially operating said driving structures, whereby said first pusher completes its stroke as said second pusher begins its stroke,
and structure for depressing the outward extending portion of said second spring-loaded finger until the central curved portion of said spring advances opposite said finger, said finger being sized to return to a position intermediate of said elements and said spring.

17. The apparatus of claim 16 wherein said elements are single-edge injector blades, positioned in said second nest chamber with the dull edges thereof maintained against the magnetized second vertical wall of said second nest chamber.

18. The apparatus of claim 16 wherein said chute comprises a longitudical vertical channel for delivering a vertical stack of springs, oriented for insertion into said magazine, onto said first platform, and said trailing portion of said first pusher is sized to engage only the lowermost spring in said stack, and to support the remainder of said stack during movement of said pusher.

19. The apparatus of claim 18 wherein said trailing portion of said first pusher includes a base structure having portions overlapping said lowermost spring between said wings and said central portion, a first projecting lug overlapping said central portion, and second and third projecting lugs overlapping, respectively, the wings of said spring, said overlapping portions and said overlapping lugs forming the said leading edge of said trailing portion, and being sized to slide under the next lowermost spring of said stack.

20. The apparatus of claim 16 including a spring detector comprising a vertically movable detecting element,
structure for moving said element in a path aligned with the portion of said second nest chamber receiving the center of said spring, between a raised position above said spring and a detecting position low enough to allow said detecting element to contact said spring,
said structure moving said detecting element to said lowered position only on movement of said pusher arms sufficient to deposit a spring in said second chamber,
and contact means responsive to the vertical drop of said detecting element whereby the absence of a spring may be detected.

21. The detector of claim 20 wherein said elements are injector blades and said detecting means is responsive to vertical displacement of said detecting element of the order of a thickness of a blade, whereby the number of blades underlying said spring in said second nest chamber may be detected.

22. The apparatus of claim 20 wherein said spring detector includes a rod associated with said detector for movement therewith and extending along said second pusher, said rod including a button projecting therefrom toward said second pusher, and said pusher includes a slot for receiving said button, said slot placed to receive said button only on movement of said pusher to deposit said spring into said chamber, said button normally sliding along said pusher, whereby receipt of said button by said slot moves said detecting element to said lowered position.

23. The apparatus of claim 6 wherein the lower wall of said second nest chamber, supporting said elements and spring, is upwardly vertically displaced from the lower wall of said first nest chamber by an amount at least slightly greater than the thickness of said lower wall of said magazine, whereby said elements and spring may freely slide into said magazine from said second nest chamber, and wherein said first loading assembly for advancing said elements and said spring into said magazine comprises a horizontally reciprocating pusher, moving longitudinally of said magazine in longitudinal alignment therewith, and having a leading portion sized to engage said spring and said elements during the forward stroke of said pusher, structure for driving said leading portion into said nest from a position adjacent the periphery of said nest to a position adjacent the said open end of said magazine for advancing said elements and said spring into said magazine, means for removing said element clamping structure and said element positioning structure from positions interfering with the advance of said elements and said spring into said chamber, and a vertically reciprocating spring depressor for depressing said spring during the forward stroke of said horizontally reciprocating pusher, and a vertically reciprocating clamp for clamping said magazine against the lower wall of said first nest chamber during the forward stroke of said horizontally reciprocating pusher.

24. The apparatus of claim 23 wherein a first vertical wall of said second nest chamber is coplanar with the adjacent first vertical wall of said first nest chamber, and the opposed second vertical wall of said second nest chamber is inwardly displaced from the opposed second vertical wall of said first nest chamber by an amount at least slightly greater than the thickness of the side of said magazine adjacent the said second vertical wall of said first nest chamber.

25. The aparatus of claim 24 wherein said elements are single edge injector blades and said opposed second vertical wall of said first nest chamber also includes a magnetic portion, whereby the dull edge of said blades slide along said wall during advance of said blades into said magazine.

26. The apparatus of claim 24 wherein said elements are single edge injector razor blades, and wherein said structure for positioning said blades in said second nest chamber near the open end of said magazine comprises a spring loaded finger pivoted in a first notch in the said first vertical wall of said second nest chamber, and having an inclined face corresponding to an inclined lateral edge of said blades, said horizontal pusher advancing said blades into contact with said inclined face, said structure for clamping said blades comprises a second spring loaded finger pivoted in a second notch in said first vertical wall of said second nest chamber, laterally displaced from said first notch in the direction of said loading assembly, each said finger having a portion normally urged to extend into said chamber toward the lower wall of said chamber, and a second portion, oppositely positioned with respect to said pivot point, extending outside said chamber walls, depressible to pivot said inward portion arcuately out of said chamber, and said means for removing said blade positioning structure and said blade clamping structure from positions interfering with the advance of said blades and said spring into said chamber comprises a vertically reciprocating depressor member arranged to depress said outwardly extending portions of said fingers upon its downward stroke.

27. The apparatus of claim 26 wherein said depressor member, depressor, said spring depressor and said magazine clamp are each secured to a single vertically repricocating shaft, and the leading portions of each are in horizontal alignment.

28. The apparatus of claim 1 wherein said end plug loader comprises a track for delivering a continuous supply of end plugs, oriented for insertion into said magazine, a loading platform for receiving the forwardmost end plug, a stop for aligning said end plug with the open end of said magazine, a horizontally reciprocating pusher including a leading portion sized to contact only said forwardmost end plug, and means for driving said pusher to move the leading portion thereof from a first position adjacent said forwardmost spring to a second position adjacent said magazine, whereby said end plug is forcibly inserted into said magazine, and thereafter returning said pusher to its said first position.

29. The apparatus of claim 28 including air pressure-operated driving means for accelerating the forward stroke of said pusher, structure for connecting said means to said pusher, and switching means for activating said air pressure driving means only during movement of said leading portion from the point where said end plug is barely contacting said magazine, to the said second position of said forward stroke, thereby to exert a force for inserting said end plug into press-fitting contact with said magazine in excess of the force exerted to move said end plug into initial contact with said magazine.

30. The apparatus of claim 39 wherein said strcture for connecting said means to said pusher comprises a piston including a piston rod secured at one end to said pusher and at the other end to a piston head, and said air-operated means includes a pressure chamber surrounding said head, and exerting pressure on the side of said head opposite said shaft, upon actuation of said air-operated means, to drive said pusher through said piston head and said rod.

31. The apparatus of claim 1 wherein said cartridge also includes a dispensing member for feeding a single element from said magazine and a used element compartment, said apparatus including a second nest for securing said magazine during assembly of said dispensing member and said used element compartment, a third loading assembly for securing said magazine into said nest, a fourth loading assembly for inserting said dispensing member onto said magazine, including means for at least momentarily lifting said elements away from the wall of said magazine, a fifth loading assembly for securing said used element compartment onto said magazine, and indexing means for advancing said nest and stopping said nest in alignment with each said assembly.

32. The apparatus of claim 31 including means for transferring a partially assembled magazine from the first said nest to said second nest, said means including a conveyor for delivering said magazine to said third loading assembly, an unloading apparatus comprising a pivotal arm for engaging a partially assembled magazine while the first said nest is stopped and transferring said nest by pivotal movement of said arm, to said conveyor, and means for pivoting said arm between said nest and said conveyor, and at least momentarily stopping said arm over said nest to engage said magazine.

33. The apparatus of claim 32 wherein said unloading apparatus includes a vacuum chuck secured to the underside of said pivotal arm having surfaces for engaging said magazine, and means for creating suction in said chuck while said arm pivots between said nest and said conveyor, and for discontinuing suction in said chuck when said arm reaches said conveyor, thereby disengaging said magazine from said chuck.

34. The apparatus of claim 33 including detecting means mounted within said vacuum chuck for determining the presence of a magazine during movement of said pivotal arm from said nest to said conveyor, and for determining the absence of a magazine during movement of said pivotal arm from said conveyor to said nest.

35. The apparatus of claim 31 including a plurality of said nests, an advancing chain, structure for securing said nests to said chain at a plurality of equally spaced positions along said chain, and wherein said loading assemblies are arranged on stationary structure adjacent said advancing chain and longitudinally spaced along said chain to locate each assembly simultaneously in approximate lateral alignment with a nest, whereby said assemblies and said nests are aligned when said chain is stopped, and wherein said indexing means operates to advance said chain for a distance substantially equal to the distance between adjacent assemblies, and to permit all said assemblies to operate simultaneously while said chain is stopped.

36. The apparatus of claim 35 wherein said indexing means comprises a rotatable member having peripheral portions for engaging said chain, a drive assembly engageable with said rotatable member, means for driving said drive assembly in a first rotary direction through a predetermined arc sufficient to move a nest between adjacent loading assemblies when said member and said drive assembly are engaged, and a clutch assembly for engaging said drive assembly and said rotatable member only during movement of said drive assembly in said first rotary direction.

37. The apparatus of claim 35 wherein each said nest includes a stationary base plate secured to said chain, an adjustable block, slidingly positioned on said base plate by a lug projecting from said base plate into a slot of predetermined size in said block, and a magazine-securing chamber secured on said adjustable block, said slot being shaped and sized to permit only rotary and lateral adjustment of said magazine chamber with respect to said base, and means for aligning said magazine-securing chamber with the facing operating assembly when said chain is stopped.

38. The apparatus of claim 37 wherein said nest also includes a pair of opposed guide blocks, secured to said base, and extending perpendicularly from said base along and spaced apart from said adjustable block, at least one said guide block being separated from said adjusting block by springs normally urging said block along said lug against the opposite said guide block, and said means for aligning said magazine-securing chamber comprises structure positioned at each said operating assembly for urging said adjusting block against at least one of said springs until said adjusting block and said magazine-securing chamber are aligned with the facing operating assembly.

39. The apparatus of claim 31 wherein said nest includes a chamber, enclosed on three sides, and sized to receive said magazine longitudinally through its open end and to support said magazine and wherein said first loading assembly comprises.

a loading area adjacent said nest for aligning said magazine longitudinally with said magazine securing chamber, said end plug facing said chamber, structure for advancing said magazine into said chamber comprising a track extending above said nest between said loading area and said nest, a pusher riding in said track and including a depending flange engaging the side of said magazine furthest from said chamber, and drive means for driving said pusher along said track alternately in a forward stroke toward said nest and in a return stroke toward said loading area, whereby said magazine is driven from said loading area into said chamber during the forward stroke of said pusher, and remains in said chamber during the said return stroke.

40. The device of claim 39 wherein said pusher comprises a block sliding along said track and a rocker centrally pivotally connected below and to said block, said rocker including a semicircular vertically projecting portion adjacent said pivot, and a rear portion carrying said dependent flange, said rear portion being spring-urged downward about said pivot to engage said flange with said magazine, said first portion being spaced from said magazine during movement of said magazine, and being pivoted into said magazine when the leading end of said magazine is advanced into the corresponding side of said chamber, by small further movement of said block, whereby said magazine is urged against the bottom of said chamber.

41. The apparatus of claim 39 including structure for advancing said magazines to said loading area, comprising a conveyor having magazines laterally aligned thereon and indexing means for intermittently driving said conveyor, and wherein said loading area includes a platform adjacent and horizontally aligned with said conveyor, and of sufficient width to accommodate more than one said magazine in lateral alignment and a perpendicular end wall for aligning the end magazine with said nest chamber, said conveyor indexing means driving said conveyor intermittently for a distance at least slightly greater than the width of a magazine, whereby said magazines are delivered by said conveyor in contiguous lateral alignment to said platform.

42. The apparatus of claim 31 wherein said dispensing member includes an element-contacting portion structured to slide along said dispensing wall within said magazine for dispensing one said element, and a second portion disposed outside of said magazine, whereby said dispensing element may be gripped and moved along said dispensing wall, and said magazine includes a slot adjacent one end of said dispensing wall for inserting said dispensing member into position with said elements, and wherein said nest comprises a horizontal runway, a chamber adjacent and opening to said runway, an opposing rear wall, a base surface disposed slightly above said runway, and two side walls extending toward said runway along said base surface, said side walls and said base surface extending only part way along said dispensing wall when said magazine is in said chamber, the overhanging portion of said magazine, including said slot for receiving said dispensing member, being sufficient to receive said dispensing member, and wherein said second loading assembly includes apparatus for advancing a dispensing member along said runway into said magazine.

43. The apparatus of claim 42 wherein said elements to be dispensed are injector razor blades, and wherein said second loading assembly includes a loading platform for receiving a blade dispensing member with said first portion aligned with the said receiving slot of said magazine, a vertically adjustable gripper for engaging the said second portion of said dispensing member, means for moving said gripper, carrying said dispensing member, alternately between said loading platform and said magazine, means for lowering said gripper into engagement with said dispensing member during movement of said gripper from said loading area to said magazine, means for simultaneously lifting said blades off the said dispensing wall of said magazine and clamping said magazine in said chamber while the said first portion of said dispensing member is advanced through said receiving slot into said magazine, and means for removing said gripper out of engagement with said dispensing member for movement of said gripper from said magazine to said loading area.

44. The apparatus of claim 43 wherein said gripper comprises an inverted U-shaped member, the two sides of which are spaced to grip the said second portion of said dispensing member, and are of a length sufficient to freely advance past said magazine while inserting said dispensing member into said receiving slot.

45. The apparatus of claim 43 including means for continuously advancing a line of said dispensing members to said loading platform, a stop member pivoted beneath said platform and a spring normally urging said stop member through a slot in said platform to maintain the first dispensing member in said line against said stop, said stop member being pivoted, against said spring, through said slot upon movement of said gripper and associated dispensing member past said guide stop, whereby the next dispensing member in said line is retained at said loading platform.

46. The apparatus of claim 42 wherein said structure for simultaneously lifting said blades and clamping said magazine comprises
   a stationary supporting block,
   a vertically reciprocating drive rod,
   a first lever arm pivoted about said stationary block, pivotally secured at one end to said drive rod, and carrying, on its other end, a blade-lifting member, which lifts said blades upon counterclockwise rotation of said feed lever arm,
   a second lever arm, pivoted about said stationary block above said first lever arm,
   spring means secured to one end of said second lever arm and to said stationary block for urging said second lever arm in a clockwise direction,
   said second lever arm including, at its other end, a clamping element for contacting said magazine upon clockwise rotation of said second lever arm, a projecting lug being located on said second lever arm between said clamping element and said stationary block,
   and a cross-arm pivotally secured at one end to said first lever arm at a point on said arm between said drive rod and said stationary block, and including at its other end an elongated slot for receiving said projecting lug of said second lever arm, said slot arranged to engage said lug to prevent clockwise rotation of said second lever arm,
   whereby the downward vertical stroke of said drive rod rotates said first lever arm counterclockwise, driving said blade lifting member into said blades, and lowering said cross arm to release said lug from said slot and allow said second lever arm to pivot in a clockwise direction, clamping said magazine.

47. A method of operating apparatus for attaching an element-dispensing member to a magazine containing said elements and means urging the elements against the dispensing wall, said element-dispensing member including an element-contacting portion structured to slide along said dispensing wall, and a gripping portion disposed outside said magazine for manipulation of said element-dispensing member, and said magazine including an opening at one end of said dispensing wall for inserting said element-contacting portion of said dispensing member within said magazine, and a second opening through said dispensing wall, said apparatus comprising an indexed nest for securing said magazine having an opening beneath said magazine, and momentarily stopped for attachment of said dispensing member to said magazine, means for gripping and advancing said dispensing member into said magazine through said magazine opening, means for raising said elements off said dispensing wall including reciprocating structure operating through said nest opening and said dispensing wall opening, said method comprising the steps of:
   advancing said dispensing member toward said magazine opening,
   introducing said reciprocating structure through said openings, thereby lifting said blades off said dispensing wall,
   advancing said dispensing member partially into said magazine until a portion of said member is between said elements and said dispensing wall,
   immediately withdrawing said reciprocating structure through said openings, said elements being thereby urged against said dispensing member, while advancing said dispensing member sufficiently to maintain said member in said magazine, completing said withdrawal at least by completion of said sufficient advance and releasing said gripping means, whereby said nest may be instantaneously indexed away from said apparatus upon sufficient attachment of said dispensing member.

48. Method for securing a used blade compartment to a magazine by inserting a wall of said magazine between an abutting portion of said used blade compartment and a lug secured to said used blade compartment, the distance between said lug and said abutting portion being only slightly greater than the thickness of said wall to be inserted therebetween, said magazine including a recess adjacent said inserted wall at a corner of said magazine for receiving said lug, said lug being located at a corresponding corner of said used blade compartment, said method comprising the steps of
   securing said magazine with said wall to be inserted uppermost,
   advancing said used blade compartment toward said magazine with said lug aligned for insertion into said recess,
   canting and tilting said used blade compartment such that the perpendicular adjacent sides nearest said lug are lowermost,
   advancing said used blade compartment toward and above said magazine until said lug contacts said recess,
   and continuing said advance while gradually reducing said cant and tilt to secure said used blade compartment onto said magazine.

49. The method of claim 48 including canting and tilting said used blade compartment by contacting said compartment against a canted and tilted vacuum chuck and applying suction through said chuck, and also including the steps of removing suction through said chuck upon contacting said lug and said recess.

50. A method for advancing a single edge razor blade into a dispenser therefor through an opening in the dispenser, comprising maintaining the dull edge of said blade against guide structure having a magnetized surface aligned with said dispenser while advancing said blade along said magnetized surface into said dispenser.

51. A method for joining flexible plastic element and a mating rigid element into a press fit comprising
   advancing said elements toward one another with a first force less than that required to overcome forces resisting said press fit until said elements are in touching contact and orientated for said press fit,
   thereupon applying a second force advancing said elements toward one another sufficiently to overcome said resisting forces,
   and immediately removing said forces upon completion of said press fit.

52. The method of claim 51 including applying said first force by a mechanical drive means, and applying said second force by a normally inoperative pneumatic drive means.

53. The method of claim 52 including holding one said element stationary and advancing the other said element through said drive means.

54. The method of claim 51 wherein one said element is a metal dispensing magazine having a rectangular opening at one end, and the other said element is a plastic end plug having a rectangular portion sized to press fit in said rectangular magazine opening.

55. Apparatus for assembling a cartridge including a magazine and a plurality of components to be inserted into said magazine, said magazine having an opening at one end for receiving said components, comprising
- a nest including a first chamber and an extending adjacent second chamber, said first chamber including structure for securing the magazine therein with its said opening facing the second chamber, said second chamber having its lower surface upwardly displaced from the lower surface of the first chamber adjacent said magazine so as to be aligned with said opening, and said second chamber also having an upright surface inwardly displaced from the adjacent upright wall of said first chamber so as to be aligned with said opening, and
- means for inserting said plurality of components into said second chamber against said displaced surfaces and advancing said components along said displaced surfaces into said magazine opening.

56. Apparatus for assembling a cartridge including a magazine, a first plurality of cartridge components to be inserted into said magazine, and a second plurality of components to be attached onto said magazine, said apparatus comprising
- a first nest structured to secure said magazine for insertion of said first plurality of cartridge components,
- a second nest structured to secure said magazine for attachment of said second plurality of cartridge components,
- means for indexing said first nest through a plurality of stations for assembling said first plurality of cartridge components,
- means for indexing said second nest through a plurality of stations for assembling said second plurality of cartridge components,
- and at least one sensor between said indexing means for controlling the relative speeds of said indexing.

57. The apparatus of claim 56 including structure for transferring said magazine from said first nest to said second nest after assembly of said first plurality of components, said structure including a track supporting a line of contiguous magazines in transit between said first nest and said second nest, and wherein said sensor is arranged to sense the number of magazines in said line.

58. The apparatus of claim 57 including a first sensor placed along said track a predetermined distance away from said second nest and a second sensor placed along said track between said first sensor and said first nest, a predetermined distance away from said first nest, each said sensor operative, in response to the position of the end of said contiguous line of magazines relative to the position of said sensors along said track to alter the ratio of the first nest indexing speed to the second nest indexing speed.

59. The apparatus of claim 58 wherein said first sensor is responsive to the absence of said contiguous line on said track adjacent said first sensor to increase said ratio, and said second sensor is responsive to the presence of said contiguous line on said track adjacent said second sensor to decrease said ratio.

References Cited
UNITED STATES PATENTS

| | | | |
|---|---|---|---|
| 2,058,147 | 10/1936 | Gustafson | 53—14 |
| 2,211,780 | 8/1940 | Jacobs | 29—525X |
| 2,325,133 | 7/1943 | Hill | 53—159 |
| 2,830,414 | 4/1958 | Sinclair | 53—37 |
| 3,220,086 | 12/1965 | Balamuth | 29—525 |
| 3,493,250 | 2/1970 | Hertel | 29—525X |

THOMAS H. EAGER, Primary Examiner

U.S. Cl. X.R.

29—211, 429, 525; 53—159